US011863982B2

(12) United States Patent
Yang et al.

(10) Patent No.: US 11,863,982 B2
(45) Date of Patent: *Jan. 2, 2024

(54) SUBSCRIBER IDENTITY PRIVACY PROTECTION AGAINST FAKE BASE STATIONS

(71) Applicant: Apple Inc., Cupertino, CA (US)

(72) Inventors: Xiangying Yang, Cupertino, CA (US); Huarui Liang, Beijing (CN); Lijia Zhang, Beijing (CN); Shu Guo, Beijing (CN); Haijing Hu, Beijing (CN); Fangli Xu, Beijing (CN); Yuqin Chen, Shenzen (CN); Dawei Zhang, Saratoga, CA (US); Li Li, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,771

(22) Filed: Jan. 5, 2023

(65) Prior Publication Data
US 2023/0164559 A1 May 25, 2023

Related U.S. Application Data

(63) Continuation of application No. 17/054,148, filed as application No. PCT/CN2018/086520 on May 11, 2018, now Pat. No. 11,589,228.

(51) Int. Cl.
*H04W 12/122* (2021.01)
*H04W 12/069* (2021.01)
(Continued)

(52) U.S. Cl.
CPC ......... *H04W 12/069* (2021.01); *H04L 9/0822* (2013.01); *H04L 9/0825* (2013.01);
(Continued)

(58) Field of Classification Search
CPC ... H04W 12/06; H04W 12/069; H04W 12/03; H04W 12/041; H04W 12/0433;
(Continued)

(56) References Cited

U.S. PATENT DOCUMENTS 10,136,318 B1 * 11/2018 Hancock ............. H04L 63/0876
11,632,734 B2 * 4/2023 Stojanovski .......... H04W 60/00
455/435.1

(Continued)

FOREIGN PATENT DOCUMENTS

CN 101312569 A 11/2008
CN 107409303 A 11/2017
(Continued)

OTHER PUBLICATIONS

International Search Report and Written Opinion, PCT/CN2018/086520, dated Jan. 24, 2019.
(Continued)

*Primary Examiner* — Shaqueal D Wade-Wright
(74) *Attorney, Agent, or Firm* — DICKINSON WRIGHT RLLP

(57) ABSTRACT

Techniques to protect a subscriber identity, by encrypting a subscription permanent identifier (SUPI) to form one-time use subscription concealed identifiers (SUCIs) using a set of one-time ephemeral asymmetric keys, generated by a user equipment (UE), and network provided keys are disclosed. Encryption of the SUPI to form the SUCIs can mitigate snooping by rogue network entities, such as fake base stations. The UE is restricted from providing the unencrypted SUPI over an unauthenticated connection to a network entity. In some instances, the UE uses a trusted symmetric fallback encryption key $K_{FB}$ or trusted asymmetric fallback public key $PK_{FB}$ to verify messages from an unauthenticated network entity and/or to encrypt the SUPI to
(Continued)

form a fallback $SUCI_{FB}$ for communication of messages with the unauthenticated network entity.

20 Claims, 22 Drawing Sheets

(51) Int. Cl.

| | |
|---|---|
| H04W 12/72 | (2021.01) |
| H04W 12/0433 | (2021.01) |
| H04W 12/03 | (2021.01) |
| H04W 12/041 | (2021.01) |
| H04L 9/08 | (2006.01) |
| H04L 9/16 | (2006.01) |
| H04L 9/32 | (2006.01) |
| H04W 12/02 | (2009.01) |

(52) U.S. Cl.
CPC .......... *H04L 9/0844* (2013.01); *H04L 9/0891* (2013.01); *H04L 9/16* (2013.01); *H04L 9/3228* (2013.01); *H04W 12/02* (2013.01); *H04W 12/03* (2021.01); *H04W 12/041* (2021.01); *H04W 12/0433* (2021.01); *H04W 12/122* (2021.01); *H04W 12/72* (2021.01)

(58) Field of Classification Search
CPC ... H04W 12/04; H04W 12/122; H04W 12/72; H04L 9/08; H04L 9/0822; H04L 9/0825; H04L 9/0844; H04L 9/0891; H04L 9/16; H04L 9/32; H04L 9/3228; H04L 63/04; H04L 63/0435; H04L 63/0422; H04L 63/0428
See application file for complete search history.

(56) References Cited

U.S. PATENT DOCUMENTS

| | | |
|---|---|---|
| 2019/0182654 A1 | 6/2019 | Jerichow et al. |
| 2020/0359195 A1 | 11/2020 | Nakarmi et al. |
| 2020/0396673 A1 | 12/2020 | Tiwari et al. |
| 2021/0176628 A1 | 6/2021 | Chikkala et al. |
| 2021/0289353 A1 | 9/2021 | You et al. |
| 2021/0345116 A1 | 11/2021 | You et al. |
| 2022/0360985 A1 | 11/2022 | Lin |
| 2022/0408243 A1* | 12/2022 | Mattsson .............. H04W 12/40 |

FOREIGN PATENT DOCUMENTS

| | | |
|---|---|---|
| WO | 2016138940 A1 | 9/2016 |
| WO | 2018052409 A1 | 3/2018 |

OTHER PUBLICATIONS

European Patent Application 16173105-4—Extended European Search Report dated Oct. 15, 2021.
"3rd Generation Partnership Project; Technical Specification Group Core Network and Terminals; Non-Access-Stratum (NAS) protocol for 5G System (5GS); Stage 3 (Release 15)", 3GPP Standard; Technical Specification; 3GPP TS 24.501, 3rd Generation Partnership Project (3GPP), Mobile Competence Centre; 650, Route Des Lucioles; F-06921 Sophia-Antipolis Cedex; France, vol. CT WGU, No. VI.1.1, May 9, 2018 (May 9, 2018), pp. 1-297, XP051451333.
NTT Docomo: "Editorials to 33.501", 3GPP Draft; S3-181439 Editorial, 3rd Generation Partnership Project (3GPP), Mobile Competence Centre; 650, Route Des Lucioles; F-06921 Sophia-Antipolis Cedex; France, vol. SA WG3, No. Belgrade (Serbia); Apr. 16, 2018-Apr. 20, 2016 Apr. 16, 2018 (Apr. 16, 2018), XP051433152, Retrieved from the Internet: URL:http://www.3gpp.org/ftp/Meetings%5F3GP P%5FSYNC/SA3/Docs/ [retrieved on Apr. 16, 2018] * paragraphs [6.1.2] - [6.1.3.1]; figures* 6.1.2-1, 6.1.3.1-1* paragraphs [6.12] - [6.12.4]*.
Anonymous: "3rd Generation Partnership Project; Technical Specification Group Services and System Aspects; Security architecture and procedures for 5G system (Release 15)", 3GPP Standard; Technical Specification; 3GPP TS 33.501, 3rd Generation Partnership Project (3GPP), Mobile Competence Centre; 650, Route Des Lucioles; F-06921 Sophia-Antipolis Cedex; France, No. VI5.0.0, Mar. 26, 2018 (Mar. 26, 2018), pp. 1-128, XP051450501, *paragraph [03.1] ** paragraphs [6.12] - [6.12.2]*.
At T et al.: "Use of PKI to Mitigate Vulnerabilities in 3GPP Networks", 3GPP Draft; S3-181129—PKI To Mitigate Vulnerabilities VI.2, 3rd Generation Partnership Project T3GPP), Mobile Competence Centre; 650, Route Des Lucioles; F-06921 Sophia-Antipolis Cedex; France vol. SA WG3, No. Belgrade, Serbia; Apr. 16, 2018-Apr. 20, 2018 Apr. 5, 2018 (Apr. 5, 2018), XP051438556, Retrieved from the Internet: URL: http://www.3gpp.org/ftp/tsg%5Fsa/WG3%5 FSecurity/TSGS3%5F91%5FBelgrade/Docs/.

* cited by examiner

UE Side Encryption (based on ECIES)

NW Side Decryption (based on ECIES)

Modified UE Side Encryption

Modified NW Side Decryption

Modified UE Side Encryption

Modified NW Side Decryption

Modified UE Side Encryption

Modified NW Side Decryption

SUBSCRIBER IDENTITY PRIVACY PROTECTION AGAINST FAKE BASE STATIONS

CROSS-REFERENCE TO RELATED APPLICATIONS

The present application is a continuation of U.S. application Ser. No. 17/054,148, entitled "SUBSCRIBER IDENTITY PRIVACY PROTECTION AGAINST FAKE BASE STATIONS," filed Nov. 9, 2020, issued Feb. 21, 2023 as U.S. Pat. No. 11,585,228, which is a National Phase filing of PCT/CN2018/086520, entitled "SUBSCRIBER IDENTITY PRIVACY PROTECTION AGAINST FAKE BASE STATIONS," filed May 11, 2018, the contents of all of which are incorporated by reference herein in their entirety for all purposes.

FIELD

The described embodiments set forth techniques for protecting subscriber identity against fake base stations when communicating messages communicated between a wireless device and a wireless network entity, including limited-use fallback encryption keys and single-use encrypted subscriber identities.

BACKGROUND

Many wireless devices are configured to use removable Universal Integrated Circuit Cards (UICCs) that enable the wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. Typically, a UICC takes the form of a small removable card, (commonly referred to as a Subscriber Identity Module (SIM) card), which is configured to be inserted into a UICC-receiving bay included in a wireless device. In more recent implementations, UICCs are being embedded directly into system boards of wireless devices. These embedded UICCs (eUICCs) can provide several advantages over traditional, removable UICCs. For example, some eUICCs include a rewritable memory that can facilitate installation, modification, and/or deletion of one or more electronic SIMs (eSIMs), which can provide for new and/or different services and/or updates for accessing extended features provided by MNOs. An eUICC can store a number of MNO profiles—also referred to herein as eSIMs—and can eliminate the need to include UICC-receiving bays in wireless devices.

An MNO profile includes a globally unique subscription permanent identifier (SUPI), such as an International Mobile Subscriber Identity (IMSI), by which a user that subscribes to services provided by the MNO can be identified uniquely by cellular wireless networks. The SUPI includes a mobile country code (MCC), a mobile network code (MNC), and a Mobile Subscriber Identification Number (MSIN). Certain messages sent between the cellular wireless network and the wireless device may include the SUPI in a clear, readable, unencrypted format, and as such the SUPI is open to snooping by passive listening or active request and reply capture techniques.

SUMMARY

Representative embodiments set forth techniques for protecting subscriber identity, by encrypting a subscription permanent identifier (SUPI) to form a subscription concealed identifier (SUCI) using a one-time ephemeral asymmetric key, generated by a user equipment (UE), and network provided keys. Encryption of the SUPI to form the SUCI can mitigate snooping and can be based on ephemeral asymmetric key pairs generated by the UE and by additional keys (including combinations of symmetric and/or asymmetric keys) generated by a wireless network entity. Keys can be one-time use and/or be updated over time. To protect against attacks from rogue network entities, e.g., fake base stations, the UE is restricted from providing the unencrypted SUPI over an unauthenticated connection to a network entity. In some instances, the UE uses a symmetric fallback encryption key $K_{FB}$ or an asymmetric fallback public key $PK_{FB}$ to verify messages from an unauthenticated network entity and/or to encrypt the SUPI for communication with the unauthenticated network entity.

The UE encrypts a mobile subscriber identifier, such as an MSIN portion of a SUPI, using one-time encryption keys to generate one-time use SUCIs. To authenticate with a cellular wireless network, the UE sends an uplink (UL) message to a cellular wireless network entity, the UL message including a one-time SUCI, a corresponding one-time ephemeral UE public key, and an identifier for a network public key used to encrypt the SUCI. The cellular wireless network entity can validate the network public key and decrypt the SUCI by deriving the encryption key using the one-time ephemeral UE public key and a network secret key that corresponds to the validated network public key. A rogue network entity will be unable to decrypt the SUCI without the network secret key and can attempt to obtain the SUPI by requesting the SUPI directly from the UE and/or by imitating a genuine cellular wireless network entity by sending a fake network public key to the UE to use for encrypting the SUPI. The UE distinguishes the rogue network entity from a genuine cellular wireless network entity by verifying a signature included with a downlink (DL) message from the genuine cellular wireless network entity that provides a new network public key. The signature is based on a trusted fallback encryption key, e.g., $K_{FB}$ or $SK_{FB}$, to which the fake base station will not have access. In some embodiments, the UE provides to a cellular wireless network entity a SUCI encrypted with a fallback encryption key when a SUCI encrypted with a network public key fails authentication. In some embodiments, the UE halts an attach procedure and provides a denial of service indication when authentication with the SUCI encrypted with the fallback encryption key fails.

For distinct authentications with a cellular wireless network, the UE sends UL messages that include different one-time SUCIs, corresponding one-time ephemeral UE public keys, and a network public key identifier. When the network public key is updated, e.g., by an over the air (OTA) update over a secure connection between the UE and a cellular wireless network server and/or by a downlink (DL) message sent to the UE by a network entity, e.g., by the cellular wireless network entity or by a third-party server providing carrier bundle updates, previously generated unused one-time SUCIs are discarded and additional new one-time SUCIs generated based on newly derived encryption keys based on the updated network public key and additional one-time ephemeral UE secret keys.

In some embodiments, updated network public keys provided via a secure connection from a trusted network entity need not be verified with the fallback encryption key. In some embodiments, the fallback encryption key is updated by a trusted network entity via a secure connection with the UE, e.g., via a carrier bundle update. The fallback encryption key may be updated infrequently or in some embodiments not at all. In some embodiments, the fallback encryption key is a symmetric key stored in a tamper resistant hardware secure element (SE) of the UE. In some embodiments, the fallback encryption key provides a higher level of security strength, e.g., 256-bit encryption, compared with normal encryption of the SUPI, e.g., 128-bit encryption. In some embodiments, the fallback encryption key is limited to a threshold number of times that the fallback encryption key may be used by the UE. In some embodiments, the fallback encryption key expires after a time period. In some embodiments, the UE encrypts the SUPI to form a fallback SUCI based on a combination of an updated network public key and the fallback encryption key, where the fallback SUCI is used for authentication when a normally encrypted SUCI fails. Both normally encrypted SUCIs and fallback SUCIs can be restricted to one-time use for messages sent to network entities. Using unique one-time SUCIs, the UE maintains privacy from fake base stations that seek to track the UE based on observing repeated use of encrypted identifier values.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
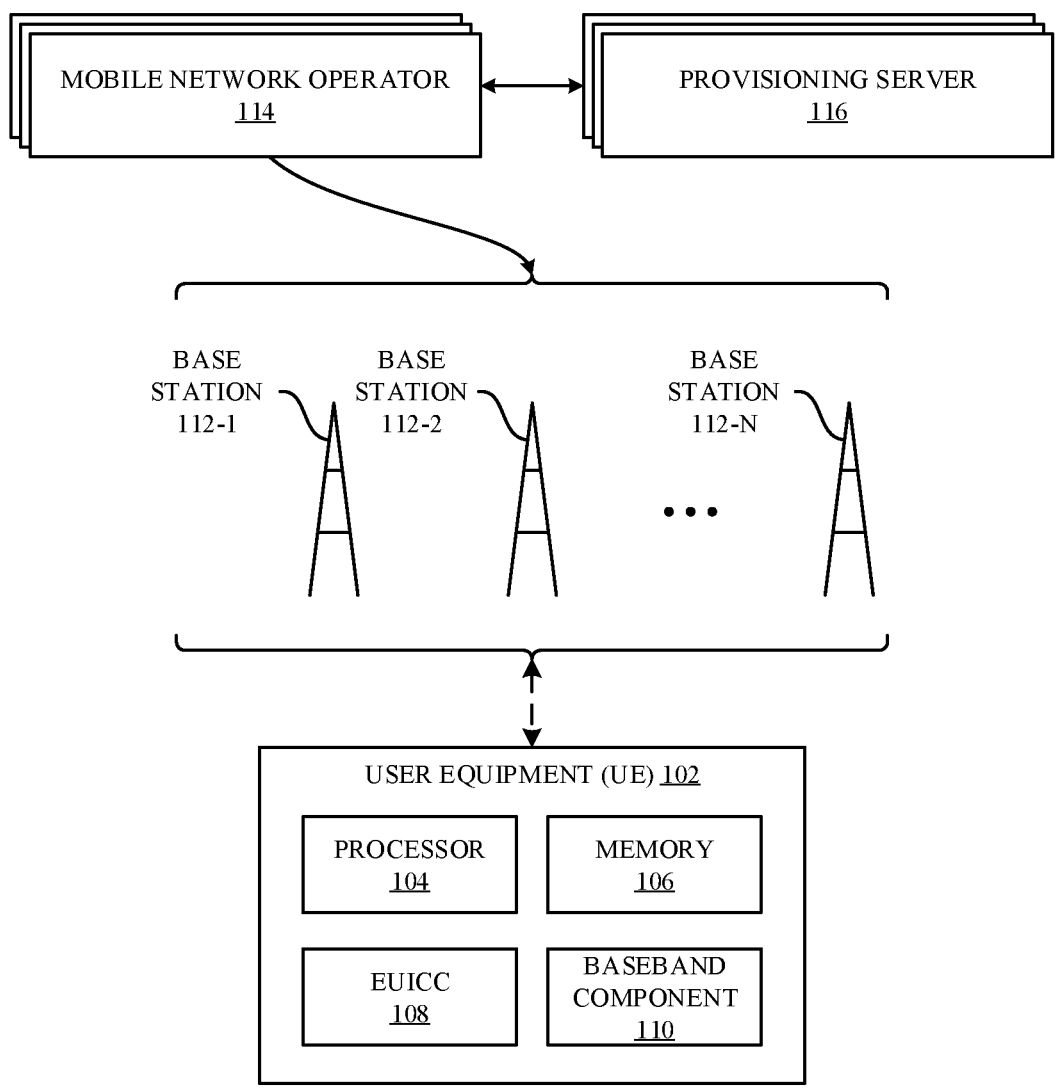
FIG. 1 illustrates a block diagram of different components of an exemplary system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or fifth generation (5G) or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that some UEs described herein may be configured as multi-mode wireless communication devices that are also capable of communicating via different third generation (3G) and/or second generation (2G) RATs. In these scenarios, a multi-mode user equipment (UE) can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative embodiments described herein set forth techniques for protecting subscriber identity in messages communicated over an unauthenticated connection between a wireless device, e.g., a user equipment (UE), and wireless network entities by encrypting a subscription permanent identifier (SUPI) to form a subscription concealed identifier (SUCI) using a one-time ephemeral asymmetric key, generated by the UE, and network provided keys. Encryption of the SUPI to form the SUCI can mitigate snooping and can be based on ephemeral asymmetric key pairs generated by the UE and by additional keys (including combinations of symmetric and/or asymmetric keys) generated by a wireless network entity. Asymmetric key pairs can be one-time use and/or be updated over time. To protect against attacks from rogue network entities, e.g., fake base stations, the UE is restricted from providing the unencrypted SUPI over an unauthenticated connection to a network entity. In some instances, when authentication fails, the UE uses a trusted fallback encryption key to verify messages from an unauthenticated network entity and/or to encrypt the SUPI for communication with the unauthenticated network entity. In some embodiments, the trusted fallback encryption key is maintained by the UE in a tamper resistant hardware secure element (SE), e.g., in a UICC, eUICC, SIM card, or secure enclave processor (SEP).

Rogue network entities, such as fake base stations that monitor signals from UEs, can actively attempt to catch an unencrypted identifier, such as an IMSI/SUPI from a UE. During an attach procedure, the rogue network entity can identify that the UE sends an encrypted identifier, e.g., a SUCI, and can reject the UE's SUCI with an error code, e.g., an "invalid key" designation or another similar message that indicates authentication with the SUCI fails. By sending the error code, the rogue network entity can imitate a genuine cellular wireless network entity, as network provided encryption keys used by the UE for generating the encrypted SUCI can be valid for a limited period of time and then expire. In some instances, a network public key used by the UE can be outdated relative to a network secret key used by the home network for authentication, such as when a UE is powered down for an extended period of time, and a network public key update is missed by the UE. If the UE responds with an unencrypted SUPI in place of the encrypted SUCI, a rogue base station could catch the UE's SUPI, which negates the privacy protection afforded by using SUCIs.

If authentication with a wireless network entity fails and the UE has a separate secure connection to a trusted cellular wireless network entity, such as to a trusted server through a Wi-Fi connection, the UE can obtain an updated network public key and generate a new SUCI to use for authentication. If authentication with a wireless network entity fails and the UE only has an unauthenticated connection with the wireless network entity, the UE can determine whether a message received from the wireless network entity can be trusted using a separate fallback encryption key that is already preloaded in the UE. A rogue base station can attempt to imitate a genuine base station by sending to the UE a fake network public key to cause the UE to send a SUCI encrypted with the fake network public key to the rogue base station. The rogue base station could then decrypt the SUCI using its own fake network secret key, thereby revealing the unencrypted SUPI to the rogue base station. To address this vulnerability, two levels of encryption keys are used in parallel, where a second level encryption key, e.g., a trusted fallback encryption key, is used when authentication errors occur.

The trusted fallback encryption key can be initially provisioned to the UE by a trusted network entity, e.g., during an initial provisioning process and/or during manufacture and/or during sales distribution. The fallback encryption key can be rarely used for communication between the UE and cellular wireless network entities, e.g., only to address network authentication errors. The fallback encryption key can have a significantly longer lifetime relative to network public keys used for encryption of the SUPI. In some embodiments, the fallback encryption key is stored securely within the UE on an eUICC and/or on a UICC and cannot be updated, in which case the eUICC must be reprogrammed or the UICC replaced to update the fallback encryption key. In some embodiments, the fallback encryption key is stored securely in the UE and can be updated via a secure connection with a network server.

A rogue network entity will be unable to decrypt the SUCI without the network secret key and can attempt to obtain the SUPI by requesting the SUPI directly from the UE and/or by imitating a genuine cellular wireless network entity by sending a fake network public key to the UE to use for encrypting the SUPI. The UE can distinguish the rogue network entity from a genuine cellular wireless network entity by verifying a signature included with a downlink (DL) message from the genuine cellular wireless network entity that provides a new network public key. The signature is based on the trusted fallback encryption key to which the fake base station will not have access. In some embodiments, the UE provides to a cellular wireless network entity a SUCI encrypted with the fallback encryption key when a SUCI encrypted with a network public key fails authentication. In some embodiments, the UE encrypts the SUPI to form a fallback SUCI using a new network public key provided by a wireless network entity with which the UE is attempting to authenticate and also with a fallback encryption key previously provided by a trusted wireless network entity. A rogue base station would not be able to decrypt the doubly encrypted fallback SUCI, as the rogue base station does not have access to the fallback encryption key, while a genuine cellular wireless network entity would be able to decrypt the doubly encrypted fallback SUCI. In some embodiments, the UE halts an attach procedure and provides a denial of service indication when authentication with the SUCI encrypted with the fallback encryption key fails.

For distinct authentications with a cellular wireless network, the UE sends UL messages that include different one-time SUCIs, corresponding one-time ephemeral UE public keys, and a network public key identifier. When the network public key is updated, e.g., by an over the air (OTA) update over a secure connection between the UE and a cellular wireless network server and/or by a downlink (DL) message sent to the UE by a network entity, e.g., by the cellular wireless network entity or by a third-party server providing carrier bundle updates, previously generated unused one-time SUCIs are discarded and additional new one-time SUCIs generated based on newly derived encryption keys based on the updated network public key and additional one-time ephemeral UE secret keys. In some embodiments, updated network public keys provided via a secure connection from a trusted network entity need not be verified with the fallback encryption key. In some embodiments, the fallback encryption key is updated by a trusted network entity via a secure connection with the UE, e.g., via a carrier bundle update. The fallback encryption key may be updated infrequently. In some embodiments, the fallback encryption key is a symmetric key stored in a tamper resistant hardware secure element (SE) of the UE. In some embodiments, the fallback encryption key provides a higher level of security strength, e.g., 256-bit encryption, compared with normal encryption of the SUPI, e.g., 128-bit encryption. In some embodiments, the fallback encryption key is limited to a threshold number of times that the fallback encryption key may be used by the UE. In some embodiments, the fallback encryption key expires after a time period. In some embodiments, the UE encrypts the SUPI to form a fallback SUCI based on a combination of an updated network public key and the fallback encryption key, where the fallback SUCI is used for authentication when a normally encrypted SUCI fails. Both normally encrypted SUCIs and fallback SUCIs can be restricted to one-time use for messages sent to network entities. Using unique one-time SUCIs, the UE maintains privacy from fake base stations that seek to track the UE based on repeated use of encrypted (or unencrypted) identifier values.

In some embodiments, the UE generates sets of encrypted subscriber identities in advance based on one-time use encryption keys derived from a network public key and one-time use, ephemeral user equipment (UE) secret keys. When a network public key is updated, the UE regenerates new one-time use encryption keys based on the updated network public key and unused one-time use, ephemeral UE secret keys. The UE can maintain the network public keys in a secure element (SE) based on over-the-air (OTA) updates received from a cellular wireless network entity. The UE can also maintain network public keys in processing circuitry external to the SE based on carrier update bundles received securely from a third-party server.

In some embodiments, a cellular wireless network entity, such as an evolved NodeB (eNodeB or eNB) or next generation Node (gNodeB or gNB), is configured with a network public key and a network secret key, while the wireless device, such as a user equipment (UE), is also configured with the network public key. The UE generates a set of one or more one-time use, ephemeral UE public key and ephemeral UE secret key pairs and derives a set of one or more one-time use encryption keys based on the one-time use, ephemeral UE secret keys and the network public key. The UE encrypts a mobile subscriber identifier of a subscription permanent identifier (SUPI), e.g., a mobile subscriber identification number (MSIN) portion of an International Mobile Subscriber Identity (IMSI), using the one-time use encryption keys to form a set of one-time use subscription concealed identifiers (SUCIs). The UE can store the one-time use encryption keys and associated one-time use, ephemeral UE public keys for subsequent authentication with a cellular wireless network entity of the cellular wireless network that provided the network public key. When authentication (or other messages that require secure identification of the UE) with a cellular wireless network is required, such as when initiating a network attachment, the UE sends to the cellular wireless network entity an uplink (UL) message that includes one of the one-time use SUCIs and the associated one-time use, ephemeral UE public key as well as an identifier for the network public key. The cellular wireless network entity can verify the network public key used for encryption of the SUCI, and when the network public key is validated, decrypt the SUCI by generating an encryption key using the one-time, use ephemeral UE public key included in the UL message and a network secret key associated with the network public key that was validated. For subsequent authentications, the UE sends UL messages that include different one-time SUCIs, corresponding one-time user, ephemeral UE public keys, and the network public key identifier.

When the network public key is updated, e.g., by an over the air (OTA) update to the UE and/or by a downlink (DL) message sent to the UE by the cellular wireless network entity, previously generated unused one-time SUCIs are discarded. Additional new one-time SUCIs are generated based on encryption keys newly derived based on the updated network public key and additional one-time ephemeral UE secret keys. In some embodiments, the one-time encryption keys can be derived as Advanced Encryption Standard (AES) keys. In some embodiments, the UE generates one-time encryption keys based on an elliptic curve Diffie-Hellman (ECDH) key agreement protocol.

These and other embodiments are discussed below with reference to FIGS. 1 through 11; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a user equipment (UE) 102, a group of base stations 112-1 to 112-n that are managed by different Mobile Network Operators (MNOs) 114, and a set of provisioning servers 116 that are in communication with the MNOs 114. The UE 102 can represent a mobile computing device (e.g., an iPhone® or an iPad® by Apple®), the base stations 112-1 to 112-n can represent cellular wireless network entities including evolved NodeBs (eNodeBs or eNBs) and/or next generation NodeBs (gNodeBs or gNB) that are configured to communicate with the UE 102, and the MNOs 114 can represent different wireless service providers that provide specific services (e.g., voice and data) to which the UE 102 can be subscribed.

As shown in FIG. 1, the UE 102 can include processing circuitry, which can include a processor 104 and a memory 106, an embedded Universal Integrated Circuit Card (eUICC) 108, and a baseband component 110. In some embodiments, the UE 102 includes one or more physical Subscriber Identity Module (SIM) cards (not shown) in addition to or substituting for the eUICC. The components of the UE 102 work in conjunction to enable the UE 102 to provide useful features to a user of the UE 102, such as localized computing, location-based services, and Internet connectivity. The eUICC 108 can be configured to store multiple electronic SIMs (eSIMs) for accessing different MNOs 114 through the base stations 112-1 to 112-n. For example, the eUICC 108 can be configured to store and manage one or more eSIMs for one or more MNOs 114 for different subscriptions to which the UE 102 is associated. To be able to access services provided by the MNOs, an eSIM can be provisioned to the eUICC 108. In some embodiments, the eUICC 108 obtains one or more eSIMs (or updates for one or more eSIMs) from one or more associated provisioning servers 116. It is noted that provisioning servers 116 can be maintained by a manufacturer of the UE 102, the MNOs 114, third party entities, and the like. Communication of eSIM data between a provisioning server 116 and the eUICC 108 (or between the provisioning server 116 and processing circuitry of the UE 102 external to the eUICC 108, e.g., the processor 104) can use a secure communication channel.

Figure 2:
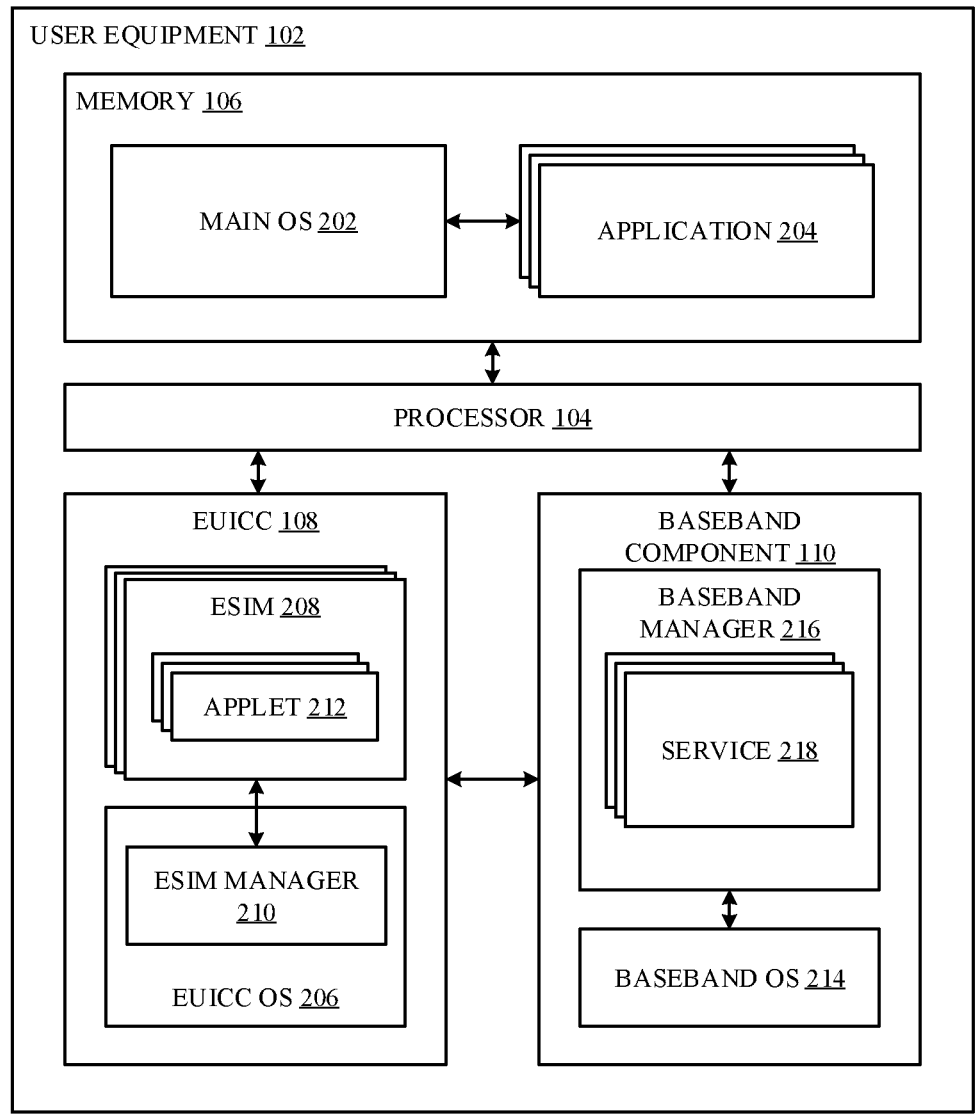
FIG. 2 illustrates a block diagram of a more detailed view of exemplary components of the system of FIG. 1, according to some embodiments.

FIG. 2 illustrates a block diagram of a more detailed view 200 of particular components of the UE 102 of FIG. 1, according to some embodiments. As shown in FIG. 2, the processor 104, in conjunction with the memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage the hardware resources of the eUICC 108 (e.g., a processor and a memory embedded in the eUICC 108). The eUICC OS 206 can also be configured to manage eSIMs 208 that are stored by the eUICC 108, e.g., by enabling, disabling, modifying, or otherwise performing management of the eSIMs 208 within the eUICC 108 and providing the baseband component 110 with access to the eSIMs 208 to provide access to wireless services for the UE 102. The eUICC 108 OS can include an eSIM manager 210, which can perform management functions for various eSIMs. According to the illustration shown in FIG. 2, each eSIM 208 can include a number of applets 212 that define the manner in which the eSIM 208 operates. For example, one or more of the applets 212, when implemented by the baseband component 110 and the eUICC 108, can be configured to enable the UE 102 to communicate with an MNO 114 and provide useful features (e.g., phone calls and internet) to a user of the UE 102.

As also shown in FIG. 2, the baseband component 110 of the UE 102 can include a baseband OS 214 that is configured to manage hardware resources of the baseband component 110 (e.g., a processor, a memory, different radio components, etc.). According to some embodiments, the baseband component 110 can implement a baseband manager 216 that is configured to interface with the eUICC 108 to establish a secure channel with a provisioning server 116 and obtaining information (such as eSIM data) from the provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the UE 102 and MNOs 114 according to the different eSIMs 208 that are enabled within the eUICC 108.

Figure 3:
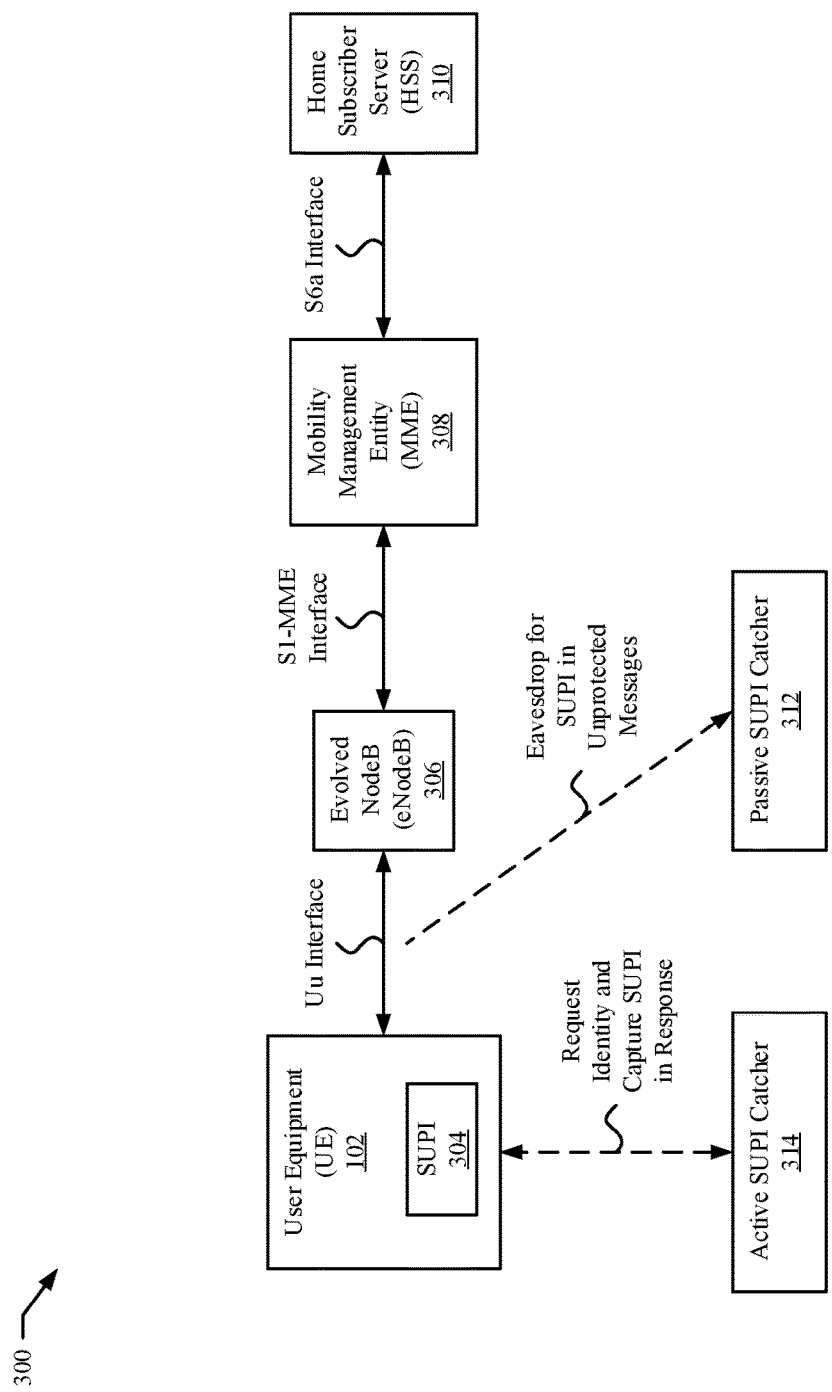
FIG. 3 illustrates a block diagram of an exemplary system subject to capture of subscriber identities, according to some embodiments.

FIG. 3 illustrates a block diagram 300 of an exemplary system subject to capture of subscriber identities. The system includes a UE 102, which includes an unencrypted subscription permanent identifier (SUPI) 304 by which a subscription for a user of the UE 102 can be uniquely identified, in communication with an exemplary cellular wireless network entity, namely an evolved NodeB (eNodeB) 306. An example of a SUPI 304 includes an international mobile subscriber identity (IMSI). The UE 102 and the eNodeB 306 can communicate via a Uu interface, which for some messages or for certain periods of time, such as prior to establishment of a secure connection between the UE 102 and the eNodeB 306, can be subject to eavesdropping by a third party. While the eNodeB 306 connects to a Mobility Management Entity (MME) 308 of the core network via a secure S1-MME interface, and the MME 308 connects to a Home Subscriber Server (HSS) 310 via a secure S6a interface, the eNodeB 306 can send some messages to and receive some messages from the UE 102 "in the clear", in some instances. For example, a Radio Resource Control (RRC) paging message sent from the eNodeB 306 to the UE 102 can include the SUPI 304 of the UE 102 in an unprotected manner. Similarly, certain RRC network access stratum (NAS) messages send from the UE 102 to the eNodeB 306 can also include the SUPI 304 of the UE 102 without using encryption to protect the SUPI 304 from eavesdroppers. Example RRC NAS messages include an RRC Attach Request message, a UE originating RRC Detach Request message, and an RRC Identity Response message. A passive eavesdropping entity, such as passive SUPI catcher 312, can listen for communication sent from the eNodeB 306, such as paging messages, or sent from the UE 102, such as attach/detach request messages, and ascertain the SUPI 304 of the UE 102. Additionally, an active eavesdropping entity, such as active SUPI catcher 314, can mimic communication from the eNodeB 306 and send a Request Identity message to the UE 102 and receive an Identity Response message that includes the SUPI 304 of the UE 102. The Uu interface between the UE 102 and the eNodeB 306 is susceptible to SUPI exposure due to passive and/or active attacks. By having the UE 102 and the eNodeB 306 securely encrypt at least a portion of the SUPI 304, such as the mobile subscriber identification number (MSIN), when communicating over an insecure communication link, the SUPI 304 can be protected from eavesdropping. Moreover, with the use of one-time use, ephemeral public/secret key pairs, the SUPI 304 can be protected from future decryption should a previously used secret key be compromised.

The techniques presented herein can apply to any messages that include a globally unique mobile subscriber identifier that is communicated between the UE 102 and a cellular wireless network entity, including over insecure connections susceptible to eavesdropping. Examples of a wireless network entity include a radio access network entity, such as the eNodeB 306 or a next generation NodeB (also referred to as a gNodeB or gNB), or a core network entity, such as the MME 308, the HSS 310, an authentication server function (AUSF), or an access and mobility function (AMF). The messages may include a mobile subscriber identifier, such as the MSIN of the SUPI 304, which can be encrypted securely to protect privacy of the mobile subscriber identifier. An encrypted version of the SUPI 304 can be referred to as a subscription concealed identifier (SUCI).

The active SUPI catcher 314 can also mimic communication from a gNodeB by indicating an authentication failure to the UE 102 in response to an attach procedure request message that includes the SUCI. If the UE 102 responds to the authentication failure with a second attach procedure request message that includes the SUPI 304, the active SUPI catcher 314 captures the SUPI 304 from the UE 102. The active SUPI catcher 314 can also mimic communication from the gNodeB by indicating the authentication failure to the UE 102 in response to the attach procedure request message that includes the SUCI and providing a fake network public key (PKnw*) to the UE 102 to use for encrypting the SUPI 304 to form a SUCI that can be decrypted by the active SUPI catcher 314. As described further herein, the UE 102 can verify messages that include network public keys based on a second level fallback encryption key, which can be a symmetric fallback encryption key $K_{FB}$ or an asymmetric fallback public key $PK_{FB}$, that is provided by a trusted source to the UE 102. When the message is verified by the symmetric fallback encryption key $K_{FB}$ or the asymmetric fallback public key $PK_{FB}$, the UE 102 can use a network public key provided over an unauthenticated connection. Alternatively, or additionally, the UE 102 can encrypt the SUPI 304 to form a fallback SUCI ($SUCI_{FB}$) based on the symmetric fallback encryption key $K_{FB}$ or based on the asymmetric fallback public key $PK_{FB}$, and reattempt authentication with the fallback $SUCI_{FB}$, which the active SUPI catcher 314 will not be able to decrypt.

Figure 4A:
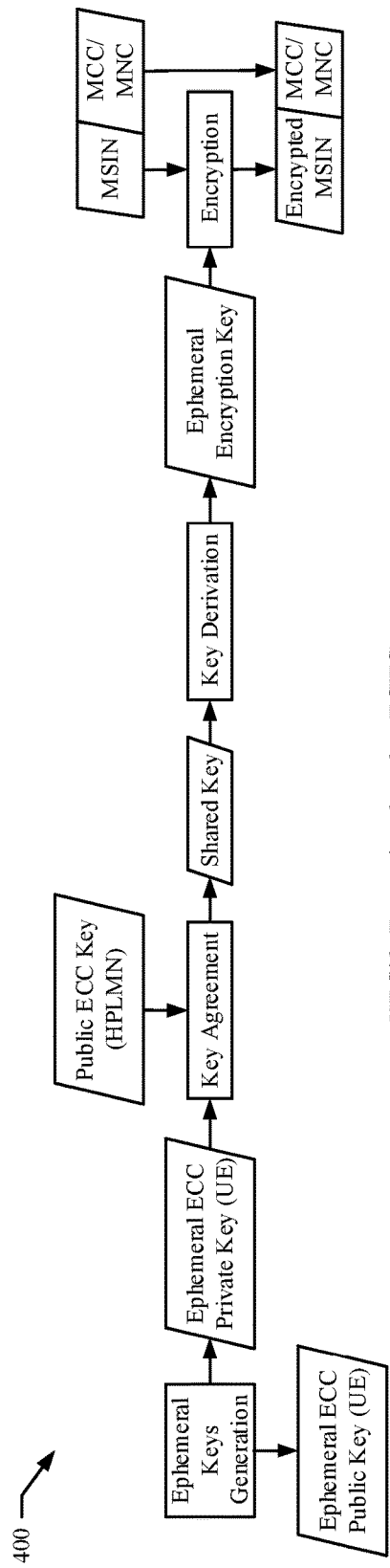
FIGS. 4A and 4B illustrate flow diagrams of a prior art encryption technique to protect a subscriber identity.
Figure 4B:
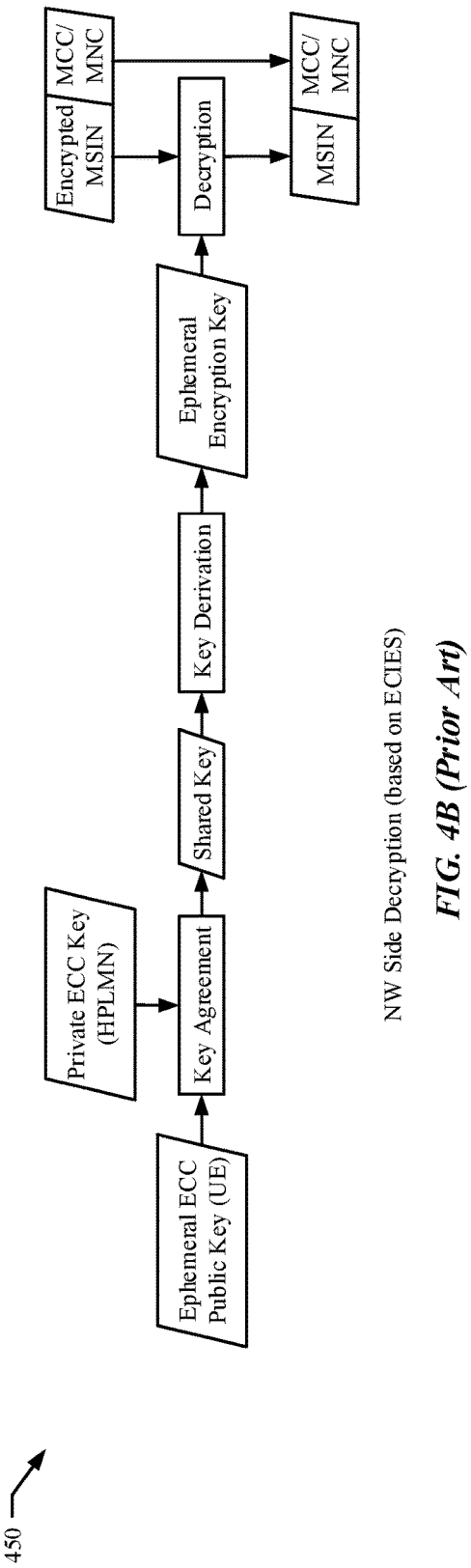

FIGS. 4A and 4B illustrate flow diagrams 400/450 of a prior art encryption technique to protect a subscriber identity. For the UE side encryption flow diagram 400, the UE 102 generates ephemeral key pairs, which include an ephemeral UE public key that can be provided to another party, such as to a cellular wireless network side entity, e.g., the eNodeB 306, and an ephemeral UE private key (which can also be referred to as a secret key). Based on a key agreement, which both the UE 102 and the cellular wireless network entity know, the UE 102 can generate a shared key (which can also be referred to as a shared secret) based on ephemeral UE private key and a network public key (also referred as a public ECC key for the Home Public Land Mobile Network or HPLMN). Similarly, the cellular wireless network entity, e.g., the eNodeB 306, can generate the shared key based on the key agreement using the ephemeral UE public key provided by the UE 102 to the cellular wireless network entity and a network private (secret) key that corresponds to the network public key known to the UE 102. The UE 102 and the cellular wireless network entity can use a common key derivation technique to determine an ephemeral encryption key with which to encrypt (to form a SUCI from the SUPI 304) and to decrypt (to recover the SUPI 304 from the SUCI). In some embodiments, the MSIN portion of the SUPI 304 is encrypted while the MCC/MNC portion of the SUPI 304 can remain unencrypted. Both the UE side encryption and the network side encryption can be based on an Elliptic Curve Integrated Encryption Scheme (ECIES). The encryption technique illustrated in FIGS. 4A and 4B can be based on static network public and private (secret) keys and as such, should the static network private key be compromised, previous communications that include the SUPI encrypted with the static network public key can be decrypted. Changing network public keys over time can overcome this deficiency.

Figure 5A:
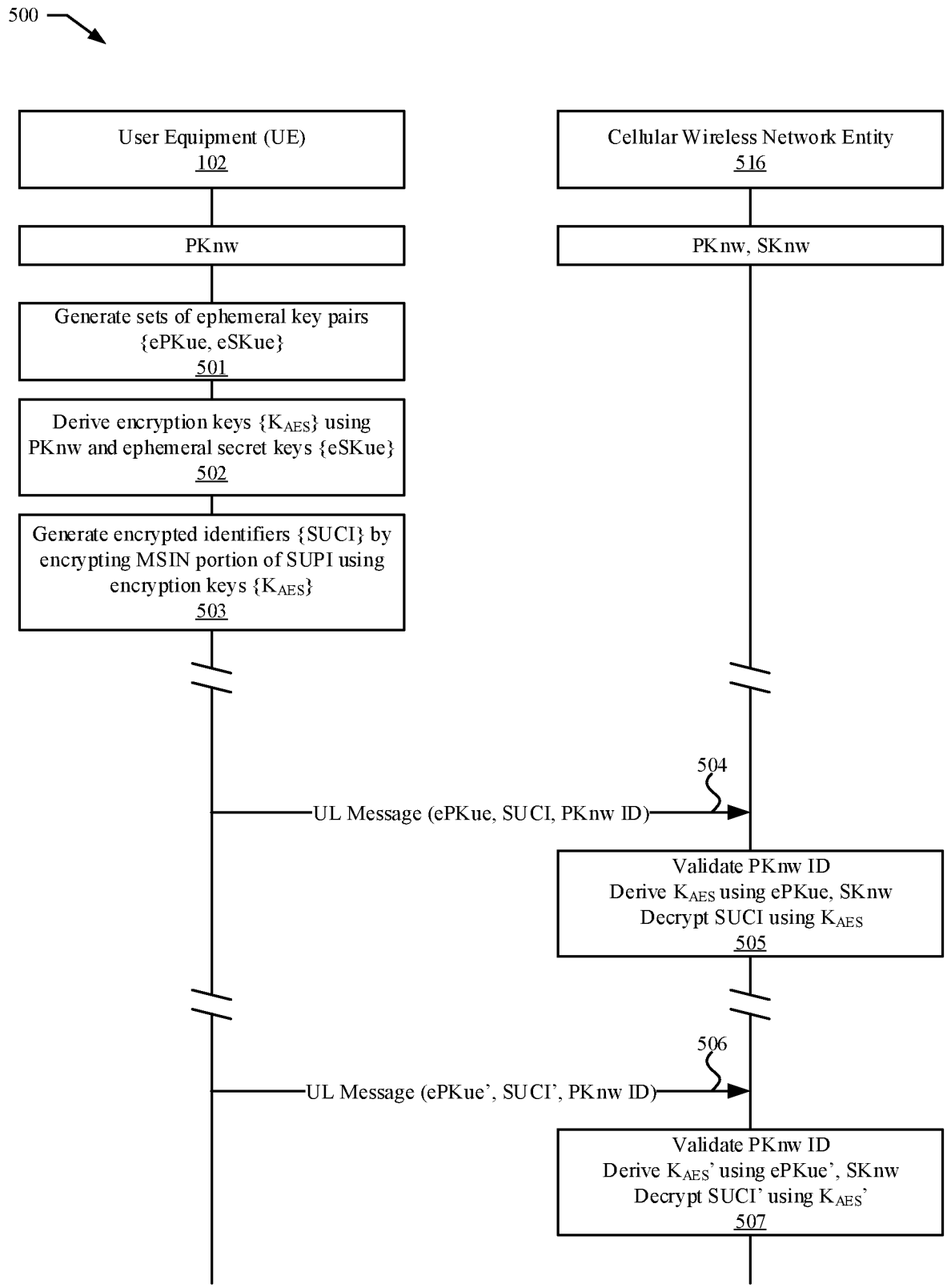
FIG. 5A illustrates an exemplary message exchange using subscriber identities encrypted in advance to protect the privacy of a subscriber identity, according to some embodiments.

FIG. 5A illustrates an exemplary message exchange 500 to generate encrypted subscriber identities in advance to use when communicating messages to protect the privacy of a subscriber identity, according to some embodiments. Initially, the UE 102 can be configured with a network public key (PKnw), while a cellular wireless network entity 516 can be configured with a corresponding network secret key (SKnw) and the PKnw. (Note that the term "secret key" is used herein synonymously for the term "private key"). The PKnw can be communicated to the UE 102 via a secure communication channel with a cellular wireless network entity, such as between the UE 102 and a provisioning server 116, or between the UE 102 and the HSS 310, or between the UE 102 and another network-based server, including in some embodiments, a third-party server (not shown). In some embodiments, the UE 102 obtains the PKnw in conjunction with an eSIM 208 (or with a SIM of a physical UICC).

At 501, the UE 102 can generate multiple sets of ephemeral key pairs, each ephemeral key pair including an ephemeral UE public key (ePKue) and a corresponding ephemeral UE secret key (eSKue). The UE 102 pre-generates the ephemeral UE key pairs {ePKue, eSKue} to reduce processing time when later authenticating with a wireless network entity using encrypted versions of subscriber identities, e.g., using SUCIs, rather than generating the ephemeral key pairs, encryption keys, and encrypted identities during authentication with the wireless network. At 502, the UE 102 derives encryption keys, e.g., Advanced Encryption Standard (AES) encryption keys ($K_{AES}$) using the UE-generated eSKue and the cellular wireless network provided public key PKnw. At 503, the UE 102 generates a set of encrypted subscriber identifiers, namely a set of SUCIs from a SUPI 304, by encrypting a mobile subscriber identifier, such as the MSIN portion of the SUPI 304 of the UE 102 using the encryption keys $K_{AES}$. The UE 102 can store the encrypted SUCIs and associated ephemeral public keys ePKue for later communication in messages to the cellular wireless network entity 516, such as during an attachment procedure that requires authentication with a cellular wireless network. In some embodiments, the UE 102 discards the ephemeral secret keys eSKue after encrypting the SUCIs. In some embodiments, the UE 102 retains the ephemeral secret keys eSKue to reuse if the network public key PKnw changes, discarding the ephemeral secret key eSKue associated with a SUCI once the SUCI is used. In some embodiments, the UE 102 discards the encryption keys $K_{AES}$ after encrypting the SUCIs.

At 504, the UE 102 sends to the cellular wireless network entity 516 a first uplink (UL) message that includes one of the SUCIs, an ephemeral UE public key ePKue associated with the ephemeral UE secret key eSKue used to encrypt the one of the SUICs, and an identifier for the network public key, e.g., PKnw ID, to indicate the network public key used for key encryption of the SUCI. In some embodiments, the PKnw ID is a hash of the PKnw or a count value, where the cellular wireless network entity 516 can ascertain which network public key $PK_nw$ the UE 102 used to generate the encryption key $K_{AES}$ with which the SUPI was encrypted to form the SUCI. In some embodiments, each SUCI is used only once, and the UE 102 discards the SUCI and associated ephemeral keys, e.g., eSKue and ePKue, after including the SUCI in an UL message.

At 505, the cellular wireless network entity 516 validates the network public key PKnw based on the identifier PKnw ID received in the UL message, and when validated, the cellular wireless network entity 516 derives the encryption key $K_{AES}$ using the ephemeral UE public key ePKue received from the UE 102 and a network secret key SKnw associated with the network public key PKnw and known by the cellular wireless network entity 516. The cellular wireless network entity 516 decrypts the SUCI using the derived encryption key $K_{AES}$. In some embodiments, the actions performed by the cellular wireless network entity can be performed in a different order, e.g., the cellular wireless network entity 516 can derive the encryption key $K_{AES}$ using the ephemeral UE public key ePKue provided by the UE 102 in the UL message and a network secret key SKnw known to be valid, and decrypts the SUCI using the generated encryption key $K_{AES}$. If the SUCI decryption fails to produce a valid SUPI, the cellular wireless network entity 516 can check the network public key identifier PKnw ID to determine if the UE 102 is using an outdated network public key PKnw.

At 506, the UE 102 sends to the cellular wireless network entity 516 a second uplink (UL) message that includes a second one of the SUCIs, indicated as SUIC', a second ephemeral UE public key indicated as ePKue' associated with a second ephemeral UE secret key eSKue' used to encrypt the SUPI to generate the second one of the SUCIs, and the identifier for the network public key, e.g., PKnw ID. The previous SUCI was used only once, and thus any compromise of the previous SUCI does not affect the security of the current SUCI, as each SUCI is encrypted using one-time ephemeral UE secret keys eSKue.

At 507, the cellular wireless network entity 516 validates the PKnw ID, and when validated, derives a second encryption key $K_{AES}'$ using the second ephemeral UE public key ePKue' and the network secret key SKnw. The cellular wireless network entity 516 can then decrypt the SUCI' using $K_{AES}'$ to recover the SUPI. The UE 102 can pre-generate encrypted SUCIs and use them for UL messages as long as the network public key PKnw used for generated the encryption keys $K_{AES}$ remains valid. If the network public key PKnw is updated, then unused SUCIs can be discarded and new SUCIs generated based on the updated PKnw as described further herein.

Figure 5B:
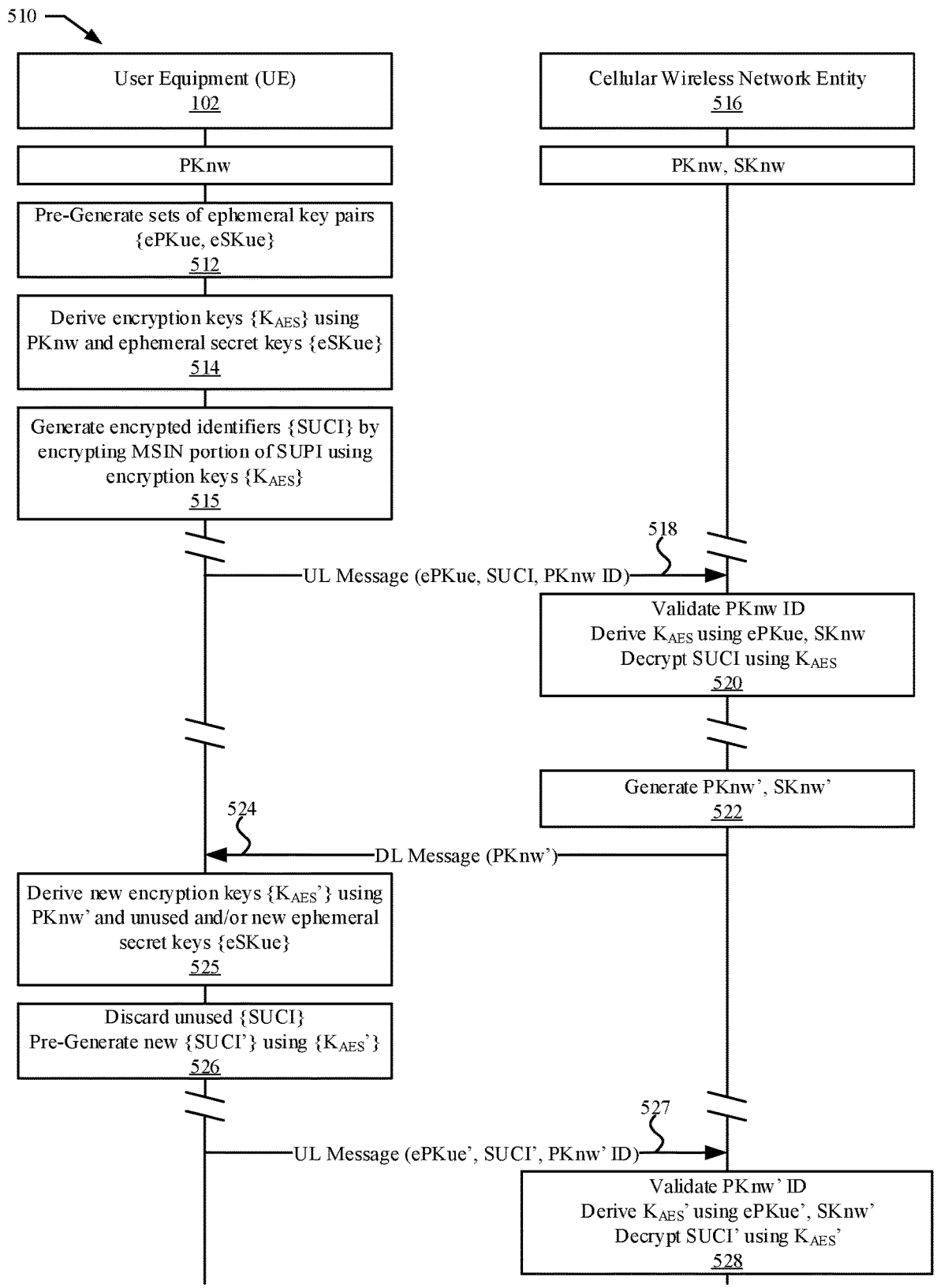
FIG. 5B illustrates an exemplary message exchange to protect the privacy of a subscriber identity including updating encrypted subscriber identities, according to some embodiments.

FIG. 5B illustrates an exemplary message exchange 510 to protect the privacy of a subscriber identity including updating encrypted subscriber identities in response to a change in a network public key, according to some embodiments. At 512, the UE 102 pre-generates a set of ephemeral key pairs {ePKue, eSKue} and, at 514, derives a set of encryption keys $\{K_{AES}\}$ based on a current network public key PKnw and the set of ephemeral secret keys {eSKue}. At 515, the UE 102 generates a set of encrypted subscription identifiers {SUCI} from a permanent subscription identifier SUPI of the UE 102, e.g., by encrypting an MSIN portion of the SUPI using the set of encryption keys $\{K_{AES}\}$, where each encryption key $K_{AES}$ can be used to generate a unique, encrypted, one-time use SUCI from the permanent subscription identifier SUPI of the UE 102. At 518, the UE 102 communicates an UL message to the cellular wireless network entity 516, such as for authentication to attach to a wireless network or to provide a location area update to the wireless network, where the UL message includes one of the encrypted SUCIs along with an associated ephemeral UE public key ePKue and an identifier for a network public key PKnw. At 520, the cellular wireless network entity 516 validates the network public key PKnw used by the UE 102 based on the identifier PKnw ID and when validated derives an encryption key $K_{AES}$ using the ephemeral UE public key ePKue from the UL message and a network secret key SKnw that corresponds to the network public key PKnw. At 520, the cellular wireless network entity 516 can then decrypt the SUCI from the UL message using the derived encryption key $K_{AES}$ to obtain the SUPI.

At 522, the cellular wireless network entity 516 generates a new network key pair {PKnw', SKnw'}. At 524, the cellular wireless network entity 516 sends a downlink (DL) message to the UE 102 that provides an updated network public key PKnw' from the newly generated network key pair {PKnw', SKnw'}. In some embodiments, the cellular wireless network entity 516 generates multiple network key pairs {PKnw, SKnw} in advance and selects new key pairs to replace older key pairs over time. At 525, the UE 102 derives a new set of encryption keys $\{K_{AES}'\}$ based on the new network public key PKnw' and any unused and/or new ephemeral secret keys {eSKue}. In some embodiments, the UE 102 derives new ephemeral secret keys {eSKue'}, such as when previous unused ephemeral secret keys {eSKue} were discarded after being used for generation of a previous set of encryption keys $\{K_{AES}\}$, and uses the new ephemeral secret keys {eSKue'} with the new network public key PKnw' to generate the new set of encryption keys $\{K_{AES}'\}$. At 526, the UE 102 discards any unused previously generated encrypted subscription concealed identifiers {SUCI} and pre-generates and new set of encrypted subscription concealed identifiers {SUCI'} from the SUPI of the UE 102 and using the new set of encryption keys $\{K_{AES}'\}$. The new set of {SUCI'} can replace the previous set of {SUCI} when sending messages to a wireless network entity, such as for authentication. At 527, the UE 102 sends an UL message to the cellular wireless network entity 516, the UL message including one of the {SUCI'}, the ephemeral UE public key ePKue' associated with the ephemeral UE secret key eSKue' used to generate the encryption key $K_{AES}'$ that was used to encrypt the SUCI' and an identifier PKnw' ID for the network public key PKnw' also used to generate the encryption key $K_{AES}'$. At 528, the cellular wireless network entity 516 validates the network public key PKnw' used by the UE 102 based on the identifier PKnw' ID and when validated derives an encryption key $K_{AES}'$ using the ephemeral UE public key ePKue' extracted from the UL message and a network secret key SKnw' that corresponds to the network public key PKnw'. The cellular wireless network entity 516 can then decrypt the SUCI' from the UL message using the derived encryption key $K_{AES}'$ to obtain the SUPI.

Figure 5C:
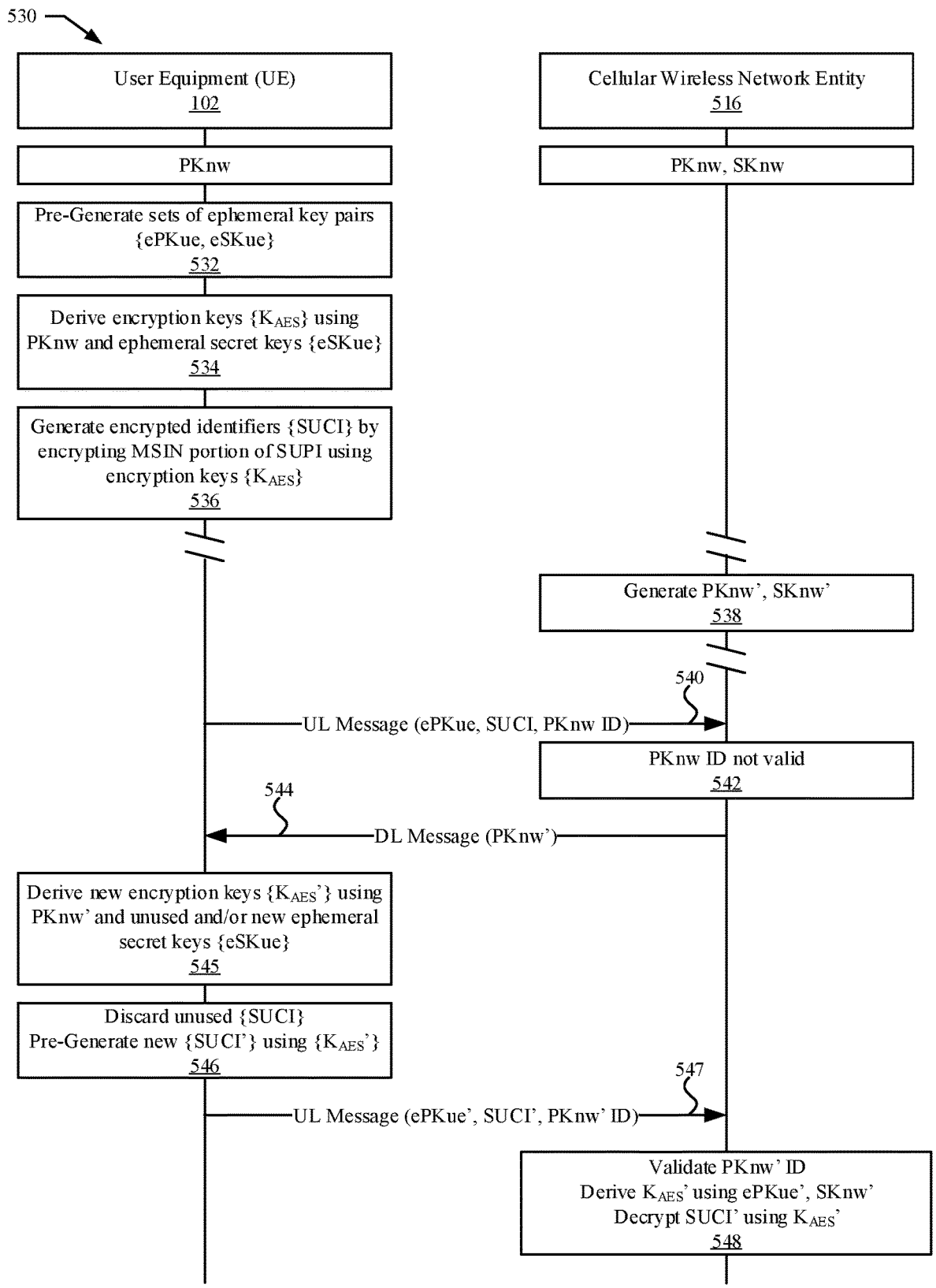
FIG. 5C illustrates another exemplary message exchange to protect the privacy of a subscriber identity including updating encrypted subscriber identities, according to some embodiments.

FIG. 5C illustrates another exemplary message exchange 530 to protect the privacy of a subscriber identity including updating encrypted subscriber identities based on a change in a network public key, according to some embodiments. As in FIGS. 5A and 5B, initially, the UE 102 can be configured with a network public key (PKnw), while the cellular wireless network entity 516 can be configured with a corresponding network secret key (SKnw) and the PKnw. At 532, the UE 102 pre-generates a set of ephemeral key pairs {ePKue, eSKue}, and the UE 102, at 534, derives a set of encryption keys {$K_{AES}$} based on a current network public key PKnw and the set of ephemeral secret keys {eSKue}. At 536, the UE 102 generates a set of encrypted subscription identifiers {SUCI} from a permanent subscription identifier SUPI of the UE 102, e.g., by encrypting an MSIN portion of the SUPI using the set of encryption keys {$K_{AES}$}, where each encryption key $K_{AES}$ can be used to generate a unique, encrypted, one-time use SUCI from the permanent subscription identifier SUPI of the UE 102. The UE 102 can store the set of {SUCI} for use in future UL messages. At 538, the cellular wireless network entity 516 generates a new network key pair {PKnw', SKnw'}. Unlike in FIG. 5B, however, the UE 102 can be unaware of the new network public key PKnw'. For example, communication of the new network public key pair PKnw' to the UE 102 can be corrupted or otherwise fail, and as such, the UE 102 continues to use the set of {SUCI} generated based on the previous network public key PKnw. At 540, the UE 102 communicates an UL message to the cellular wireless network entity 516, such as for authentication to attach to a wireless network or to provide a location area update to the wireless network, where the UL message includes one of the encrypted SUCIs along with an associated ephemeral UE public key ePKue and the identifier PKnw ID for the network public key PKnw. At 542, the cellular wireless network entity 516 can determine that the network public key identifier PKnw ID is not valid, as the more recently generated key pair {PKnw', SKnw'} can supersede use of the previously generated key pair {PKnw, SKnw}. In some embodiments, key pairs are associated with validity time periods, which may overlap for a limited period of time between successively generated key pairs to allow for updating. For the message exchange 530 of FIG. 5C, the previously generated key pair {PKnw, SKnw} may no longer be valid, e.g., when the validity time period has elapsed. As the network public key PKnw used by the UE 102 for encryption of the SUCI is no longer valid, the cellular wireless network entity can discard the UL message and provide an update to the UE 102, e.g., via a DL message at 544, the DL message including an indication of the updated network public key PKnw'. In response to receipt of the DL message, the UE 102 can recognize that the set of {SUCI} generated based on the previous public key PKnw are outdated. The UE 102, at 545, can derive a new set of encryption keys {$K_{AES}$'} based on the updated public key PKnw' and on a set of unused and/or new ephemeral UE secret keys {eSKue}. In some embodiments, the UE 102 generates a new set of ephemeral UE secret keys {eSKue'} and associated ephemeral UE public keys {ePKue'} and generates the new set of encryption keys {$K_{AES}$'} based on the new set of ephemeral UE secret keys {eSKue'} and the updated public key PKnw'. At 546, the UE 102 discards unused SUCI from the previously generated set of {SUCI} and pre-generates a new set of {SUCI'} using the new set of encryption keys {$K_{AES}$'}. At 547, the UE 102 sends a new UL message that includes a new encrypted subscription identifier SUCI' along with the associated ephemeral UE public key ePKue' and an identifier PKnw' ID for the updated public key PKnw'. The new UL message sent at 547 allows the UE 102 to retry performing an action, such as authentication with the cellular wireless network entity 516, that previously failed based on an expired network public key PKnw. At 548, the cellular wireless network entity 516 validates the public key PKnw' used for the UE 102 based on the identifier PKnw' ID obtained from the UL message, and when validated, derives the encryption key $K_{AES}$' using the ephemeral UE public key ePKue' included in the UL message and the currently valid network secret key SKnw' associated with the public key PKnw'. The cellular wireless network entity 516 decrypts the SUCI' from the UL message using the derived encryption key $K_{AES}$' to obtain the unencrypted subscription identifier SUPI.

Initial network public keys and updates to network public keys can be provided to the UE 102 through different mechanisms. In some embodiments, a cellular wireless network entity updates a network public key maintained by a secure element (SE), e.g., the eUICC 108, of the UE by sending an OTA update to the SE. In some embodiments, a third-party server provides a carrier bundle update to the processing circuitry external to the SE of the UE, e.g., to the processor 104, the carrier bundle update including one or more updated network public keys for one or more cellular wireless networks.

Figure 5D:
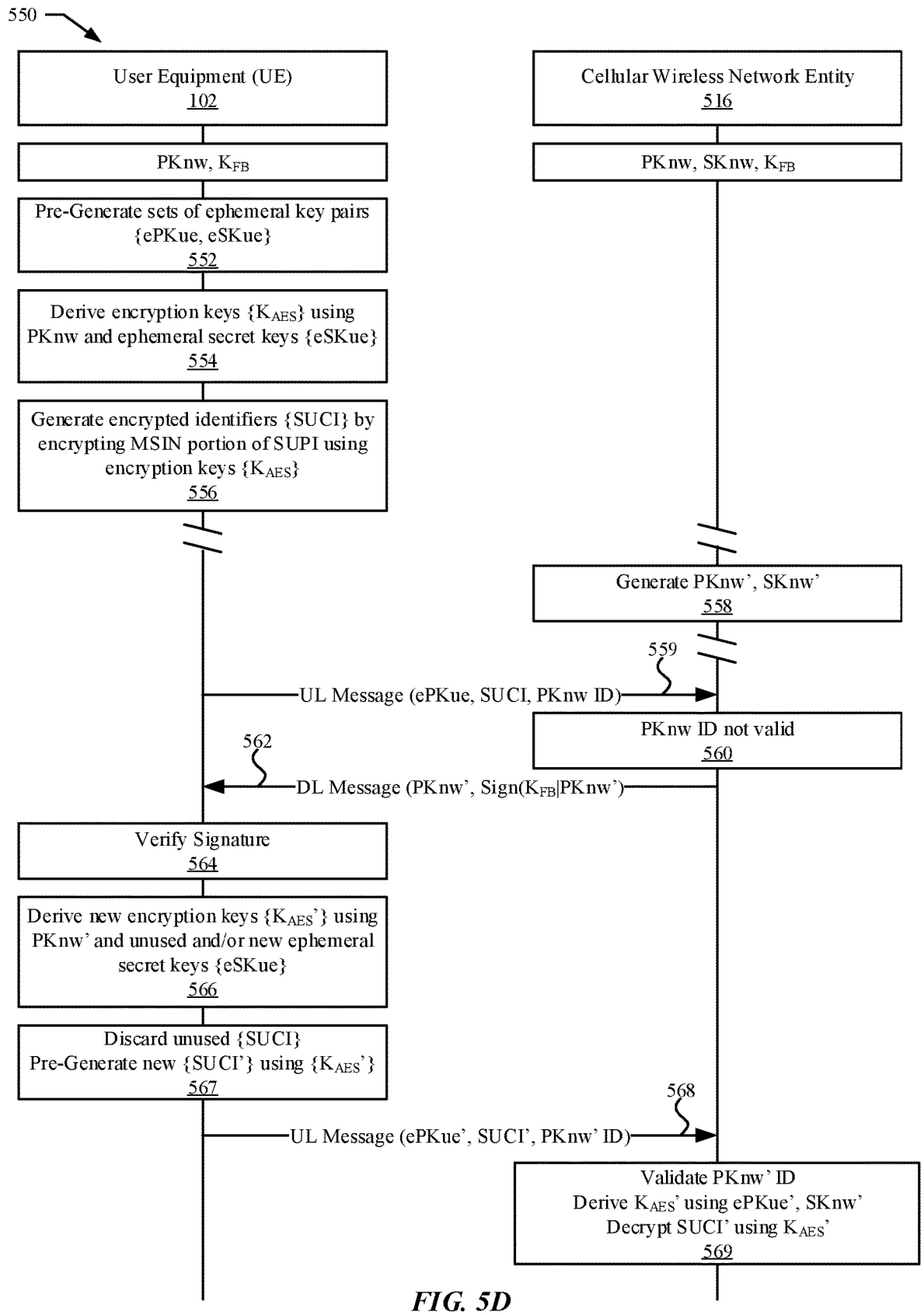
FIG. 5D illustrates another exemplary message exchange to protect the privacy of a subscriber identity including updating encrypted subscriber identities after verification of an updated network public key, according to some embodiments.

FIG. 5D illustrates another exemplary message exchange 550 to protect the privacy of a subscriber identity including updating encrypted subscriber identities based on a change in a network public key that is also protected with a symmetric fallback encryption key $K_{FB}$, according to some embodiments. Initially, the UE 102 can be configured with a network public key (PKnw) and the symmetric fallback encryption key $K_{FB}$, while the cellular wireless network entity 516 can be pre-configured with a corresponding network secret key (SKnw), the network public key PKnw, and the symmetric fallback encryption key $K_{FB}$. In some embodiments, the $K_{FB}$ is a symmetric key that can be used both for encryption, decryption, and/or signing by the cellular wireless network entity 516 and by the UE 102. At 552, the UE 102 pre-generates a set of ephemeral key pairs {ePKue, eSKue} and, at 554, the UE 102 derives a set of encryption keys {$K_{AES}$} based on a current network public key PKnw and the set of ephemeral secret keys {eSKue}. At 556, the UE 102 generates a set of encrypted subscription identifiers {SUCI} from a permanent subscription identifier SUPI of the UE 102, e.g., by encrypting an MSIN portion of the SUPI using the set of encryption keys {$K_{AES}$}, where each encryption key $K_{AES}$ can be used to generate a unique, encrypted, one-time use SUCI from the permanent subscription identifier SUPI of the UE 102. The UE 102 can store the set of {SUCI} for use in future UL messages. At 558, the cellular wireless network entity 516 generates a new network key pair {PKnw', SKnw'}. The UE 102 can be unaware of the new network public key PKnw' generated at 558. For example, communication of the new network public key PKnw' to the UE 102 can be corrupted or otherwise fail, such as when the UE 102 is powered off for an extended period of time and does not receive the communication of the new network public key PKnw'. As such, the UE 102 can continue to use the set of {SUCI} generated based on the previous network public key PKnw, the UE 102 being unaware of the new network public key PKnw'. At 559, the UE 102 communicates an UL message to the cellular wireless network entity 516, such as for authentication to attach to a wireless network or to provide a location area update to the wireless network, where the UL message includes one of the encrypted SUCIs along with an associated ephemeral UE public key ePKue and the identifier PKnw ID for the network public key PKnw. At 560, the cellular wireless network entity 516 can determine that the network public key identifier PKnw ID is not valid, as the more recently generated network key pair {PKnw', SKnw'} can supersede use of the previously generated network key pair {PKnw, SKnw}. In some embodiments, network key pairs are associated with validity time periods, which may overlap for a limited period of time between successively generated network key pairs to allow for updating. For the message exchange 550 of FIG. 5D, the previously generated network key pair {PKnw, SKnw} may no longer be valid, e.g., when the validity time period has elapsed.

As the network public key PKnw used by the UE 102 for encryption of the SUCI is no longer valid, the cellular wireless network entity can provide an update to the UE 102, e.g., via a DL message at 562, the DL message including an indication of the updated public key PKnw' accompanied by a verifiable signature based on the updated public key PKnw' and the symmetric fallback encryption key $K_{FB}$. A rogue network entity may not have access to the symmetric fallback encryption key $K_{FB}$, and therefore cannot provide the verifiable signature. At 564, the UE 102 can verify the signature to ensure that the updated public key PKnw' can be from a trusted source. When verification of the signature of the DL message is successful, the UE 102 can recognize that the set of {SUCI} generated based on the previous public key PKnw are outdated. The UE 102, at 566, can derive a new set of encryption keys {$K_{AES}'$} based on the updated public key PKnw' and on a set of unused and/or new ephemeral UE secret keys {eSKue}. In some embodiments, the UE 102 generates a new set of ephemeral UE secret keys {eSKue'} and associated ephemeral UE public keys {ePKue'} and generates the new set of encryption keys {$K_{AES}'$} based on the new set of ephemeral UE secret keys {eSKus'} and the updated public key PKnw'. At 567, the UE 102 discards unused SUCIs from the previously generated set of {SUCI} and pre-generates a new set of {SUCI'} using the new set of encryption keys {$K_{AES}'$}. At 568, the UE 102 sends a new UL message that includes a new encrypted subscription identifier SUCI' along with the associated ephemeral UE public key ePKue' and an identifier PKnw' ID for the updated public key PKnw'. The new UL message sent at 574 allows the UE 102 to retry performing an action, such as authentication with the cellular wireless network entity 516, that previously failed based on an expired network public key PKnw. At 569, the cellular wireless network entity 516 validates the public key PKnw' used for the UE 102 based on the identifier PKnw' ID obtained from the UL message, and when validated, derives the encryption key $K_{AES}'$ using the ephemeral UE public key ePKue' included in the UL message and the currently valid network secret key SKnw' associated with the public key PKnw'. The cellular wireless network entity 516 decrypts the SUCI' from the UL message using the derived encryption key $K_{AES}'$ to obtain the unencrypted subscription identifier SUPI. Verifying the signature at 564 using the symmetric fallback encryption key $K_{FB}$ ensures the UE 102 does not send a SUCI encrypted with a fake network public key to a rogue network entity.

Figure 5E:
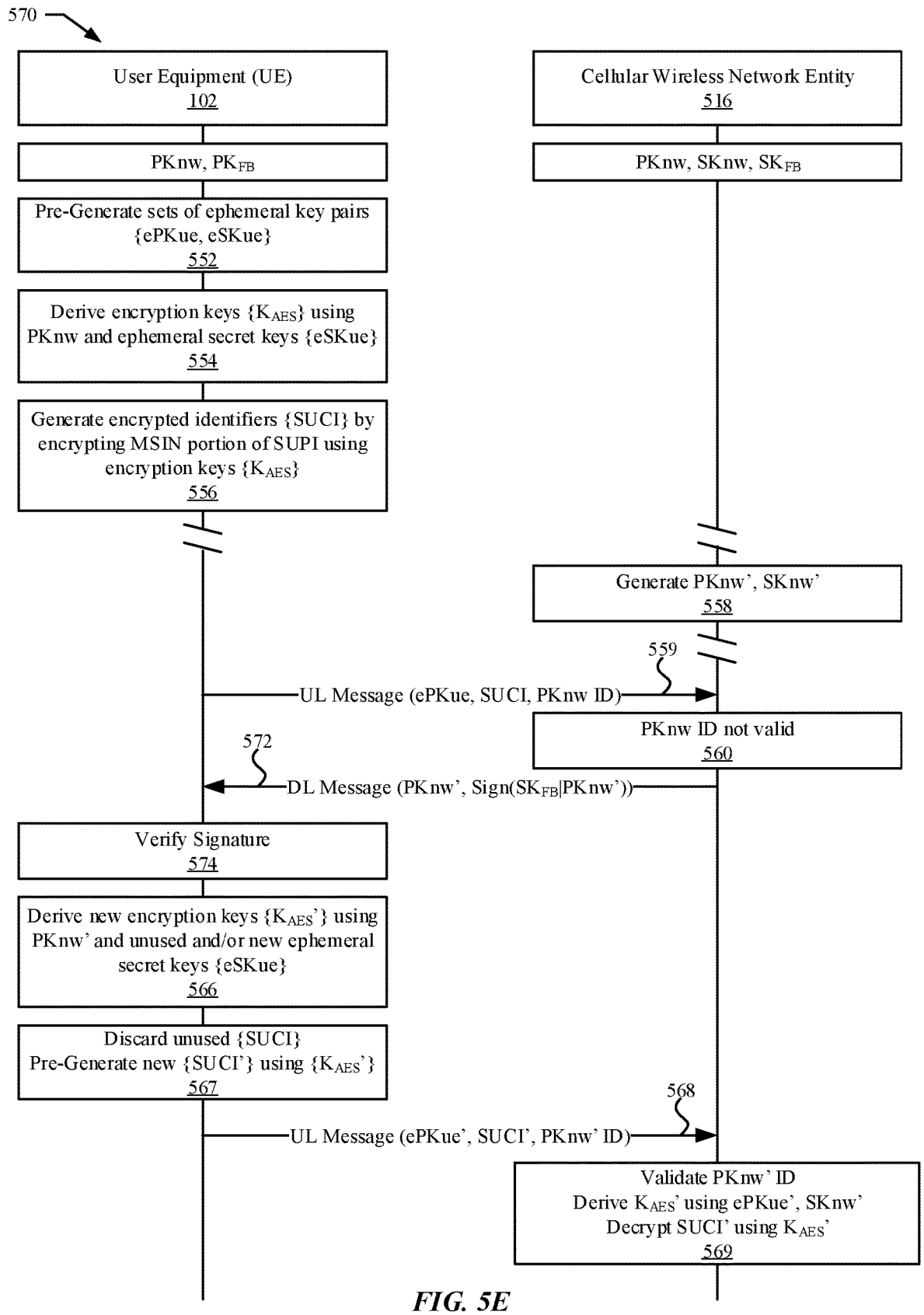
FIG. 5E illustrates a further exemplary message exchange to protect the privacy of a subscriber identity including updating encrypted subscriber identities after verification of an updated network public key, according to some embodiments.

FIG. 5E illustrates a message exchange sequence 570 that is a variant of the message exchange sequence 550 of FIG. 5D. In place of a symmetric fallback encryption key $K_{FB}$, the UE 102 can be configured with fallback public key $PK_{FB}$, while the cellular wireless network entity 516 can be configured with a corresponding fallback secret key $SK_{FB}$. At 572, the cellular wireless network entity 516 can communicate to the UE 102 the DL message including the updated network public key PKnw' and a signature of the updated network public key PKnw' based on the fallback secret key $SK_{FB}$. At 574, the UE 102 can verify the signature in the DL message to ascertain whether to trust cellular wireless network entity 516 and use the updated network public key PKnw' for encryption of new SUCI'. Otherwise, the actions in FIG. 5E are identical to the actions described in the message exchange sequence 550 of FIG. 5D.

Figure 6A:
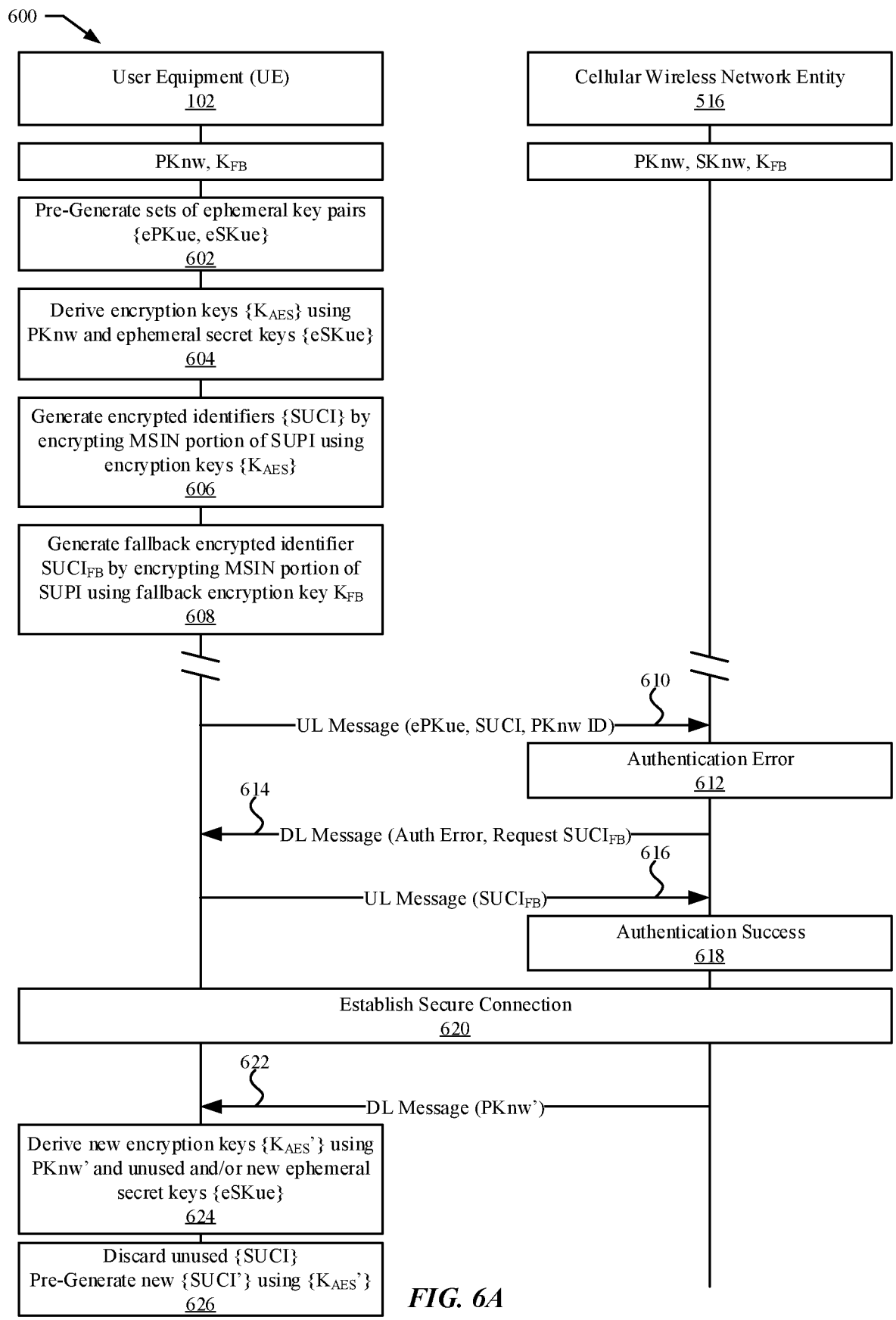
FIGS. 6A and 6B illustrate exemplary message exchanges to protect the privacy of a subscriber identity including use of a fallback encryption key to protect communication during an authentication error condition, according to some embodiments.

FIG. 6A illustrates a message exchange sequence 600 to protect the privacy of a subscriber identity including using a fallback encrypted subscription identifier $SUCI_{FB}$ to authenticate with a cellular wireless network, according to some embodiments. The UE 102 can be configured with a network public key PKnw and a symmetric fallback encryption key $K_{FB}$, while the cellular wireless network entity 516 can be configured with PKnw, a corresponding network secret key SKnw, and the symmetric fallback encryption key $K_{FB}$. At 602, the UE 102 pre-generates one or more sets of ephemeral key pairs {ePKue, eSKue}. At 604, the UE 102 derives a set of one or more encryption keys {$K_{AES}$}, each encryption key $K_{AES}$ based on the network public key PKnw and an ephemeral secret key eSKue from the sets of ephemeral key pairs {ePKue, eSKue}. At 606, the UE 102 generates a set of one or more encrypted identifiers {SUCI} by encrypting an MSIN portion of a SUPI of the UE 102 using the set of encryption keys {$K_{AES}$}. At 608, the UE 102 additionally generates a fallback encrypted identifier $SUCI_{FB}$ by encrypting the MSIN portion of the SUPI using the symmetric fallback encryption key $K_{FB}$. In some embodiments, in place of the symmetric fallback encryption key $K_{FB}$, the UE 102 can use a fallback public key $PK_{FB}$ (not shown) for which the cellular wireless network entity 516 has a corresponding fallback secret key $SK_{FB}$ (not shown) available for use by the cellular wireless network entity 516. The regular SUCI and the fallback $SUCI_{FB}$ can be stored for subsequent use in messages communicated with the cellular wireless network entity 516. At 610, the UE 102 sends an UL message to the cellular wireless network entity 516, such as during an attach procedure, to provide authentication, and/or to provide a location area update. The UL message includes a pre-generated SUCI, an associated ephemeral UE public key ePKue, and an identifier for the network public key PKnw. At 612, the cellular wireless network entity 516 determines that an authentication error has occurred, e.g., based on an expired network public key PKnw used by the UE 102. At 614, the cellular wireless network entity 516 sends a DL message to the UE 102, the DL message indicating the authentication error and requesting that the UE authenticate by sending a fallback $SUCI_{FB}$ that was generated using the symmetric fallback encryption key $K_{FB}$. At 616, the UE 102 sends a second UL message to the cellular wireless network entity 516, the second UL message including the fallback $SUCI_{FB}$. At 618, the cellular wireless network entity determines that the UE 102 is authenticated, and at 620, the UE 102 and the cellular wireless network entity 516 perform a set of actions to establish a secure connection 620 between themselves. After the secure connection is established with the UE 102, the cellular wireless network entity 516, at 622, sends to the UE 102 a second DL message that includes an updated network public key PKnw'. At 624, the UE 102 derives a new set of encryption keys {$K_{AES}'$} using the updated network public key PKnw' and newly generated or previously generated and unused ephemeral UE secret keys {eSKue}. At 626, the UE 102 discards previously generated SUCI that were generated based on the previous network public key PKnw and generates a set of new SUCI' using the new set of encryption keys {$K_{AES}'$}.

Figure 6B:
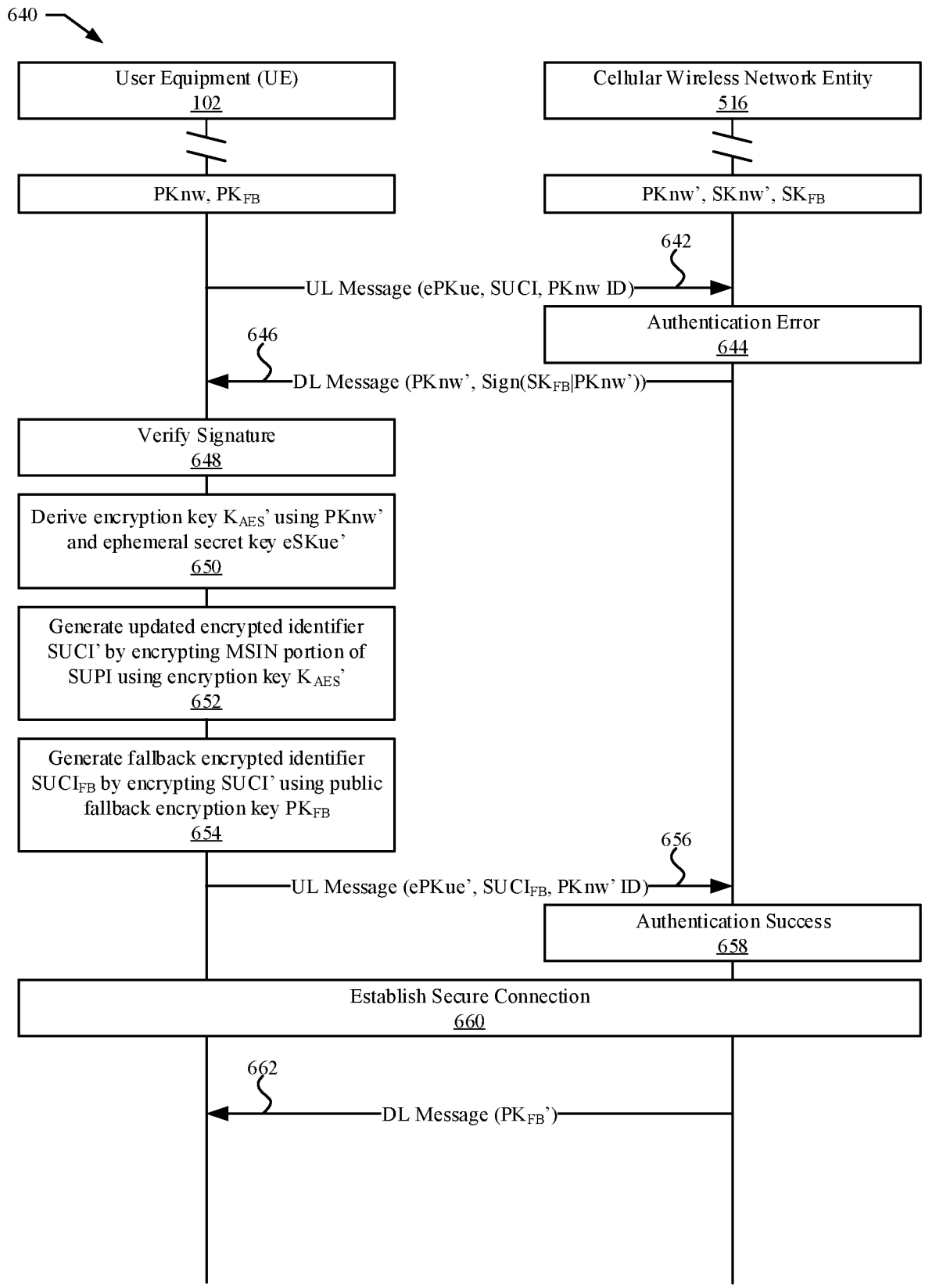

FIG. 6B illustrates a message exchange sequence 640 to protect the privacy of a subscriber identity including use of an asymmetric fallback encryption key pair $\{PK_{FB}, SK_{FB}\}$. The UE 102 can be configured with a network public key PKnw and a fallback public key $PK_{FB}$, while the cellular wireless network entity 516 can be configured with an updated network public key PKnw', an updated network secret key PKnw', and a fallback secret key $SK_{FB}$, which corresponds to the fallback public key $PK_{FB}$ available at the UE 102. As previously described herein, asymmetric network key pairs can be updated over time, and in some instances, the UE 102 may miss an update for an asymmetric network key pair resulting in the UE 102 using an outdated (and therefore invalid) network public key for encryption of the SUPI to generate the SUCI to communicate to the cellular wireless network entity 516 for authentication during an attach procedure (or for communication of another message used for authentication of the UE 102 with the cellular wireless network entity 516). The asymmetric fallback encryption key pair $\{PK_{FB}, SK_{FB}\}$ is updated infrequently, if at all, and only under conditions that ensure the UE 102 and the cellular wireless network entity 516 are aligned on which asymmetric fallback encryption key is current, and therefore, as shown in FIG. 6B, the fallback public key $PK_{FB}$ at the UE 102 corresponds to the fallback secret key $SK_{FB}$ at the cellular wireless network entity 516. The UE 102 can have previously generated a set of one or more encrypted SUCI identifiers based on the network public key PKnw and an ephemeral UE secret key eSKue as described previously herein. At 642, the UE 102 sends a UL message to the cellular wireless network entity 516, such as during an attach procedure, to provide authentication, and/or to provide a location area update. The UL message includes a SUCI, an ephemeral UE public key ePKue associated with the ephemeral UE secret key eSKue used to generate the SUCI, and an identifier for the network public key PKnw. At 644, the cellular wireless network entity 516 determines that an authentication error has occurred, e.g., based on an expired network public key PKnw used by the UE 102. At 646, the cellular wireless network entity 516 sends a DL message to the UE 102, the DL message including an updated network public key PKnw' and a signature with which to verify the updated network public key PKnw', where the signature is based on the fallback secret key $SK_{FB}$. At 648, the UE 102 can verify the signature in the DL message to determine whether to trust the DL message from the cellular wireless network entity 516 and to use the updated network public key PKnw' provided by the cellular wireless network entity 516. A rogue base station will not have access to the fallback asymmetric key pair $\{PK_{FB}, SK_{FB}\}$ and therefore should not be able to imitate a genuine base station. When the signature is verified, the UE 102, at 650, can derive an updated encryption key $K_{AES}'$ using the updated network public key PKnw' provided in the DL message and a new ephemeral secret key eSKue' (as the previous ephemeral secret key eSKue was already used to generate the encrypted SUCI that was rejected due to the authentication error). At 652, the UE 102 generates an updated encrypted SUCI', e.g., by encryption of an MSIN portion of the SUPI using the updated encryption key $K_{AES}'$. At 654, the UE 102 generates a fallback encrypted identifier $SUCI_{FB}$ by further encrypting the SUCI' using the fallback public key $PK_{FB}$. At 656, the UE 102 sends a second UL message to the cellular wireless network entity 516, the second UL message including the updated network public key identifier PKnw' ID, the fallback $SUCI_{FB}$, and the updated ephemeral UE public key ePKue'. At 658, the cellular wireless network entity successfully authenticates the UE 102 based on decryption of the fallback $SUCI_{FB}$. A rogue wireless network entity, e.g., a fake base station, would not have access to the fallback secret key $SK_{FB}$ and thus would not be able to decrypt the fallback $SUCI_{FB}$. By encrypting the SUCI' with the fallback public key $PK_{FB}$, the UE 102 ensures the unencrypted subscriber identity SUPI is not revealed to the rogue wireless network entity, thereby preserving privacy of the subscriber identity. At 660, the UE 102 and the cellular wireless network entity 516 establish a secure connection, and using the secure connection at 662, in some embodiments, the cellular wireless network entity 516 sends to the UE 102 a second DL message, which includes an updated fallback public key $PK_{FB}'$. The UE 102 can store the updated fallback public key $PK_{FB}'$ for use later during authentication when an authentication error occurs. Updating of the fallback public key $PK_{FB}$ is optional and may not occur in some cases.

Figure 7A:
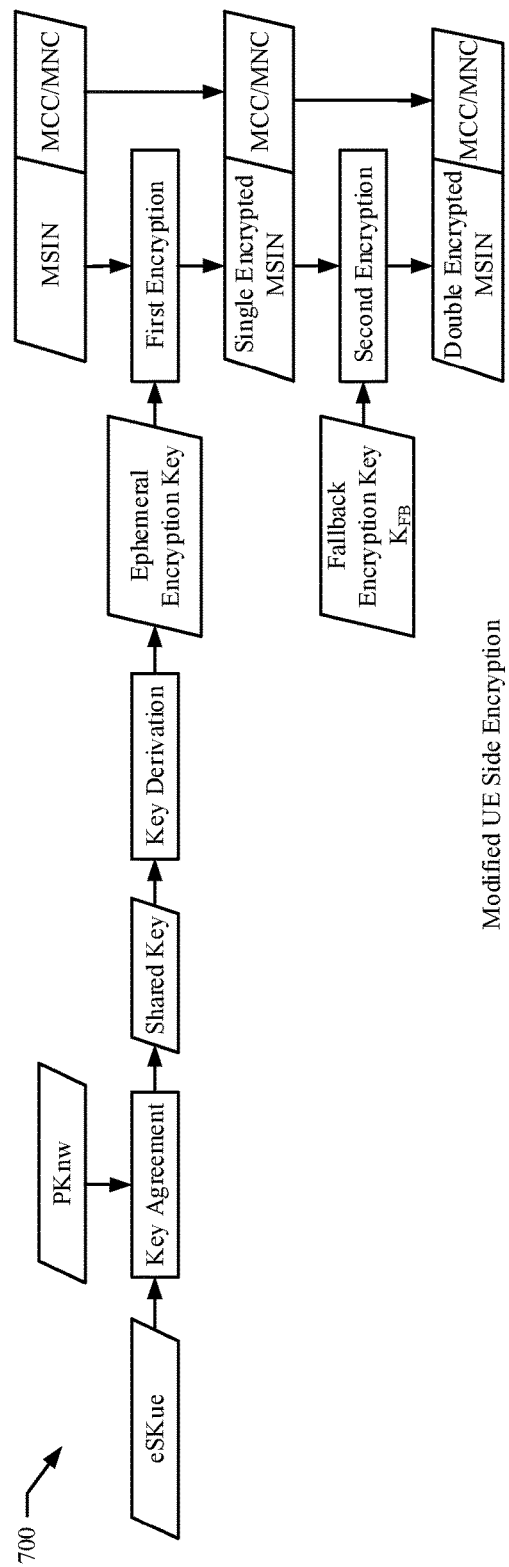
FIGS. 7A, 7B, 7C, 7D, 7E, 7F, 7G, and 7H illustrate flow diagrams of exemplary modified encryption techniques to protect a subscriber identity, according to some embodiments.
Figure 7B:
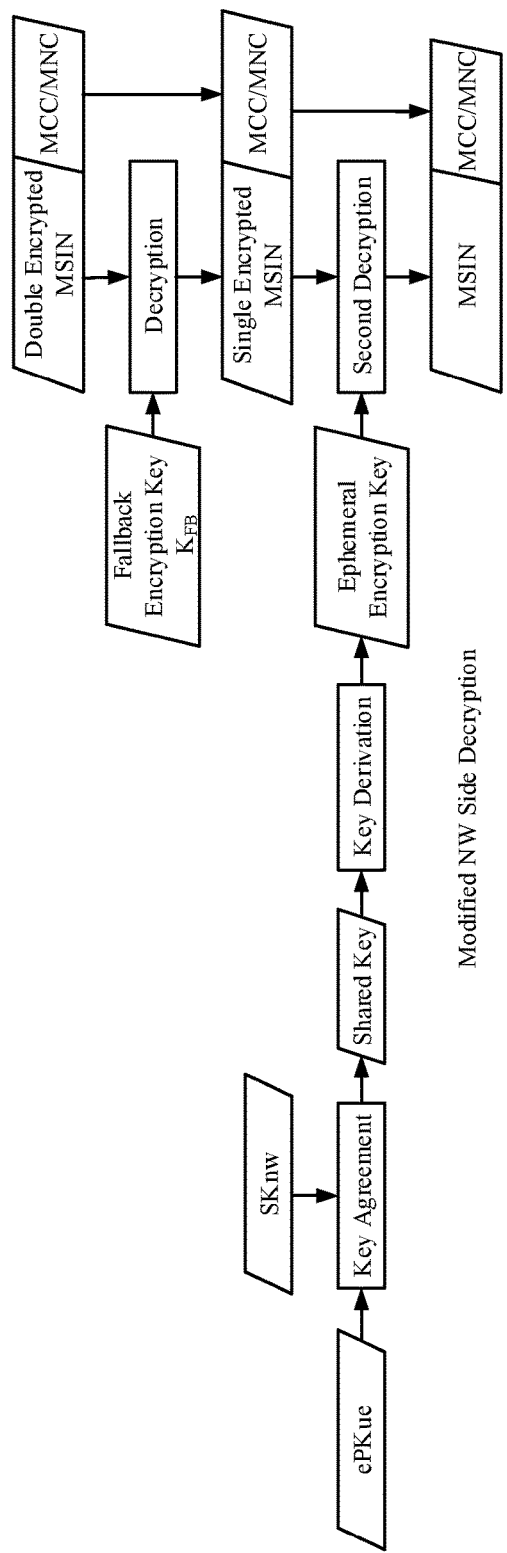

FIGS. 7A and 7B illustrate flow diagrams of exemplary modified encryption techniques that doubly encrypt (and doubly decrypt) a SUPI to generate a fallback $SUCI_{FB}$. FIG. 7A illustrates a flow diagram 700 of an example of double encryption using first an ephemeral encryption key and second a symmetric fallback key $K_{FB}$. Both the UE side and the network side can have access to the symmetric fallback encryption key $K_{FB}$. Both the UE side and the network side can generate the ephemeral encryption key. The network public key PKnw and the ephemeral UE secret key eSKue are used at the UE side to generate the ephemeral encryption key, e.g., a 128-bit length $K_{AES}$, which is used to provide a first encryption of the MSIN portion of the SUPI to form a single encrypted MSIN of the SUCI. The fallback encryption key $K_{FB}$, which can be an encryption key with a higher level of protection than the 128-bit length $K_{AES}$, such as a 256-bit length key, is used to provide a second encryption of the encrypted MSIN portion of the SUCI to generate a double encrypted MSIN portion of the fallback $SUCI_{FB}$.

FIG. 7B illustrates a flow diagram 705 of an example of double decryption using first the symmetric fallback key $K_{FB}$ and second the ephemeral encryption key. The network side can use the symmetric fallback key $K_{FB}$ to decrypt the double encrypted MSIN of the fallback $SUCI_{FB}$ to generate the single encrypted MSIN of the SUCI. The network secret key SKnw, corresponds to the network public key PKnw used by the UE side, and the ephemeral UE public key ePKue are used at the network side to generate the ephemeral encryption key, e.g., $K_{AES}$, which is used to provide decryption of the single encrypted MSIN portion of the SUCI to generate the unencrypted MSIN portion of the unencrypted SUPI.

In some embodiments, the network public key PKnw used by the UE 102 can be a new network public key provided by the cellular wireless network entity 516 before authentication, and as such, the UE 102 may not know whether to trust the cellular wireless network entity 516. By doubly encrypting with both the new network public key provided by the cellular wireless network entity 516 and the symmetric fallback key $K_{FB}$ previously provided by a trusted network entity, the UE 102 can prevent unauthorized snooping to obtain the SUPI, should the cellular wireless network entity 516 turn out to be a rogue network entity, such as a fake base station. When authentication fails using with the double encryption, the UE 102 can conclude that the cellular wireless network entity 516 cannot be trusted, halt an attach procedure, and discard the new network public key as invalid. When authentication succeeds using the double encryption, the UE 102 can conclude that the cellular wireless network entity 516 can be trusted and that the new network public key provided by the cellular wireless network entity can be valid and stored for continued and/or future use.

Figure 7C:
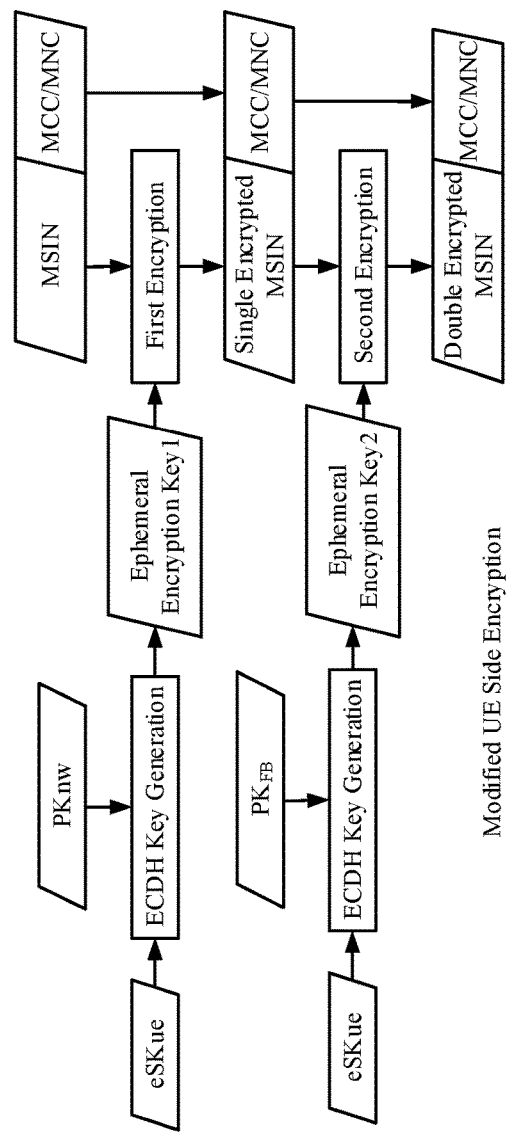
Figure 7D:
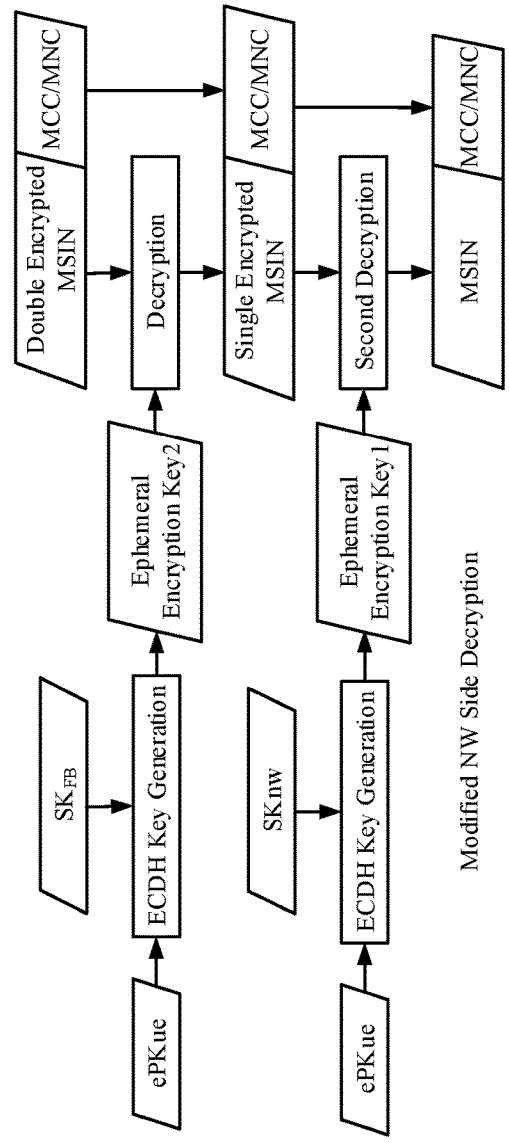

FIGS. 7C and 7D illustrate flow diagrams of additional exemplary modified encryption techniques that doubly encrypt (and doubly decrypt) a SUPI to generate a fallback $SUCI_{FB}$. While the modified encryption technique of FIGS. 7A and 7B use a symmetric fallback key $K_{FB}$, the techniques illustrated in FIGS. 7C and 7D can use an asymmetric fallback key pair $\{PK_{FB}, SK_{FB}\}$. FIG. 7C illustrates a flow diagram 710 of an example of double encryption using a first ephemeral encryption key (Key 1) generated based on a network public key PKnw and an ephemeral UE secret key eSKue, and a second ephemeral encryption key (Key2) generated based on an asymmetric fallback public key $PK_{FB}$ and the ephemeral UE secret key eSKue. The UE side can have access to the asymmetric fallback public key $PK_{FB}$, and the network side can have access to the corresponding asymmetric fallback secret key $SK_{FB}$. The UE side provides the ephemeral UE public key ePKue to the network side, while the network side provides the network public key PKnw to the UE side. Both the UE side and the network side can generate the same set of ephemeral encryption keys {Key1, Key2}. The first ephemeral encryption key (Key1) based on the network public key PKnw is used to provide a first encryption of the MSIN portion of the SUPI to form a single encrypted MSIN of the SUCI. The second ephemeral encryption key (Key2) based on the asymmetric fallback public key $PK_{FB}$ is used to provide a second encryption of the encrypted MSIN portion of the SUCI to generate a double encrypted MSIN portion of the fallback $SUCI_{FB}$. In some embodiments, the first and second encryption keys Key1 and Key2 have different encryption strengths, e.g., the first encryption key Key1 can be a 128-bit key while the second encryption key Key2 can be a 256-bit key. In some embodiments, the first and second encryption keys Key1 and Key2 can have similar encryption strengths, e.g., both the first and second encryption key can be 128-bit keys. The key generation algorithms used to generate the ephemeral encryption keys, e.g., ECDH key generation, can also differ for the first and second ephemeral encryption keys Key1 and Key2 or can be the same.

FIG. 7D illustrates a flow diagram 715 of an example of double decryption using (i) the second ephemeral encryption key Key2, which is based on the asymmetric fallback secret key $SK_{FB}$, for a first decryption and (ii) the first ephemeral encryption key Key1, which is based on the network secret key SKnw, for a second decryption. The network side can use the second ephemeral encryption key Key2 to decrypt the double encrypted MSIN portion of the fallback $SUCI_{FB}$ to generate the single encrypted MSIN portion of the SUCI. The network side can then use the first ephemeral encryption key Key1 to decrypt the single encrypted MSIN portion of the SUCI to generate the unencrypted MSIN portion of the SUPI. The network side can generate the ephemeral keys using the network secret key SKnw, which corresponds to the network public key PKnw used by the UE side and the ephemeral UE public key ePKue provided by the UE side to the network side.

Double encryption based on the flow diagrams 710 and 715 of FIGS. 7C and 7D provide similar benefits as the flow diagrams 700 and 705 of FIGS. 7A and 7B in that authentication failure can indicate that a new network public key provided by the network side (e.g., the cellular wireless network entity 516) cannot be trusted and should be not be used, while authentication success can indicate that the new network public key can be trusted, valid, and stored for continued and/or future use.

Figure 7E:
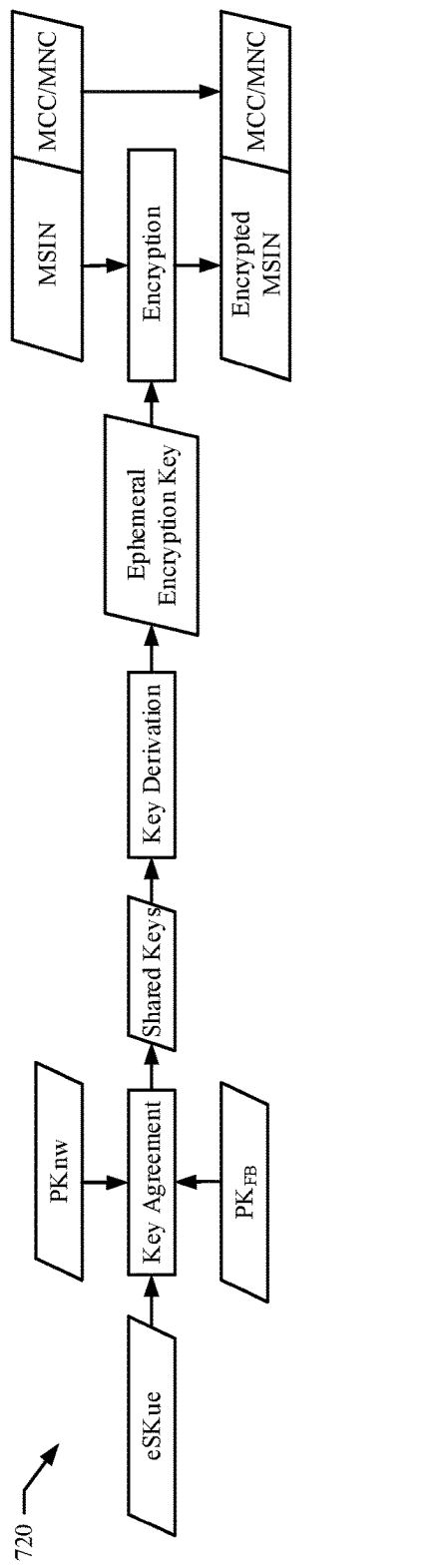
Figure 7F:
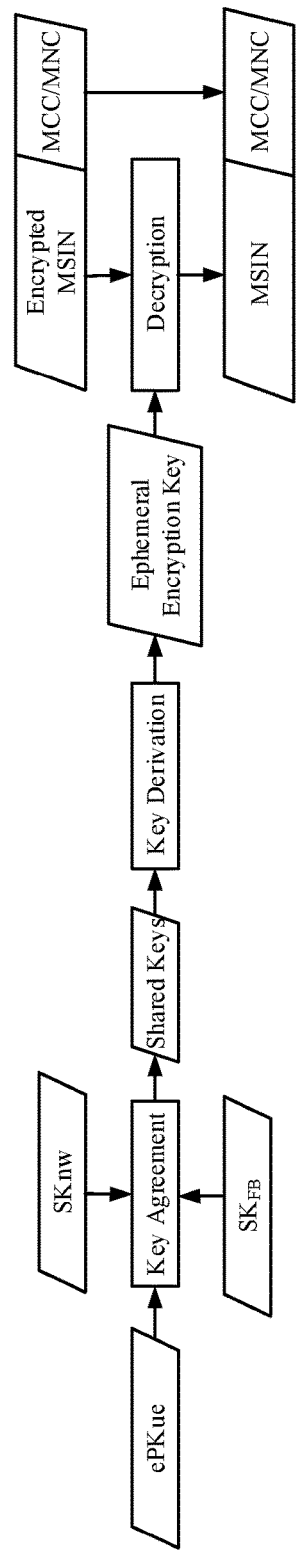

FIGS. 7E and 7F illustrate flow diagrams of additional exemplary modified encryption techniques that encrypt (and decrypt) a SUPI to generate a fallback $SUCI_{FB}$. As with the modified encryption techniques illustrated in FIGS. 7C and 7D, the techniques illustrated in FIGS. 7E and 7F can use an asymmetric fallback key pair $\{PK_{FB}, SK_{FB}\}$. FIG. 7E illustrates a flow diagram 720 of a UE side encryption using both a fallback public key $PK_{FB}$ and a network public key PKnw in combination with an ephemeral UE secret key eSKue to generate an ephemeral encryption key to encrypt an MSIN portion of a SUPI to generate the encrypted MSIN portion of a SUCI. A key agreement protocol known to both the UE side and the network side can combine the several keys to generate one or more shared keys that can be used to derive an ephemeral encryption key.

FIG. 7F illustrates a flow diagram 725 of the corresponding network side decryption using both a fallback secret key $SK_{FB}$, which corresponds to the fallback public key $PK_{FB}$ used by the UE side, a network secret key SKnw, which corresponds to the network public key PKnw used by the UE side, and an ephemeral UE public key ePKue, which corresponds to the ephemeral UE secret key eSKue used by the UE side, to generate a set of shared keys and derive an ephemeral encryption key with which to decrypt an encrypted MSIN portion of a SUCI to obtain the unencrypted MSIN of a SUPI. The fallback secret key $SK_{FB}$ can be not known by a rogue wireless network entity, which can therefore not decrypt the encrypted SUCI to generate the unencrypted SUPI.

Double encryption based on the flow diagrams 720 and 725 of FIGS. 7E and 7F provide similar benefits as the flow diagrams of FIGS. 7A, 7B, 7C and 7D in that authentication failure can indicate that a new network public key provided by the network side (e.g., the cellular wireless network entity 516) cannot be trusted and should be not be used, while authentication success can indicate that the new network public key can be trusted, valid, and stored for continued and/or future use.

Figure 7G:
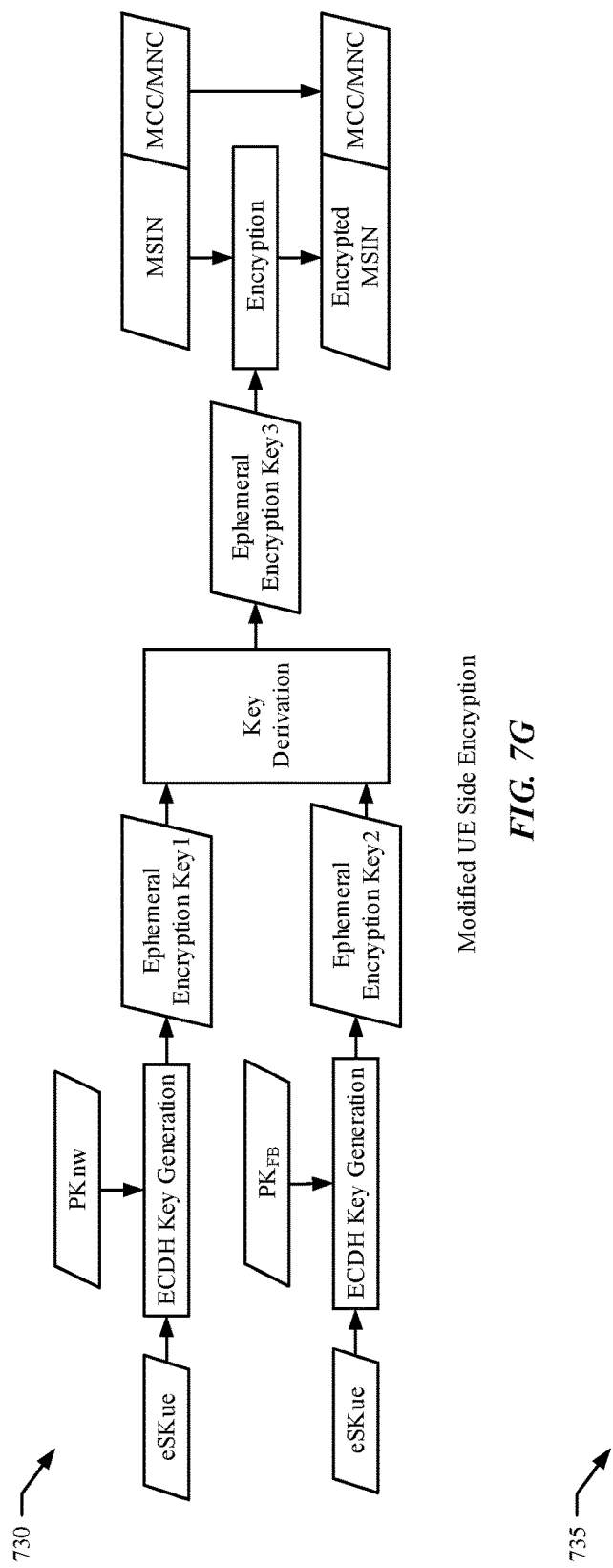
Figure 7H:
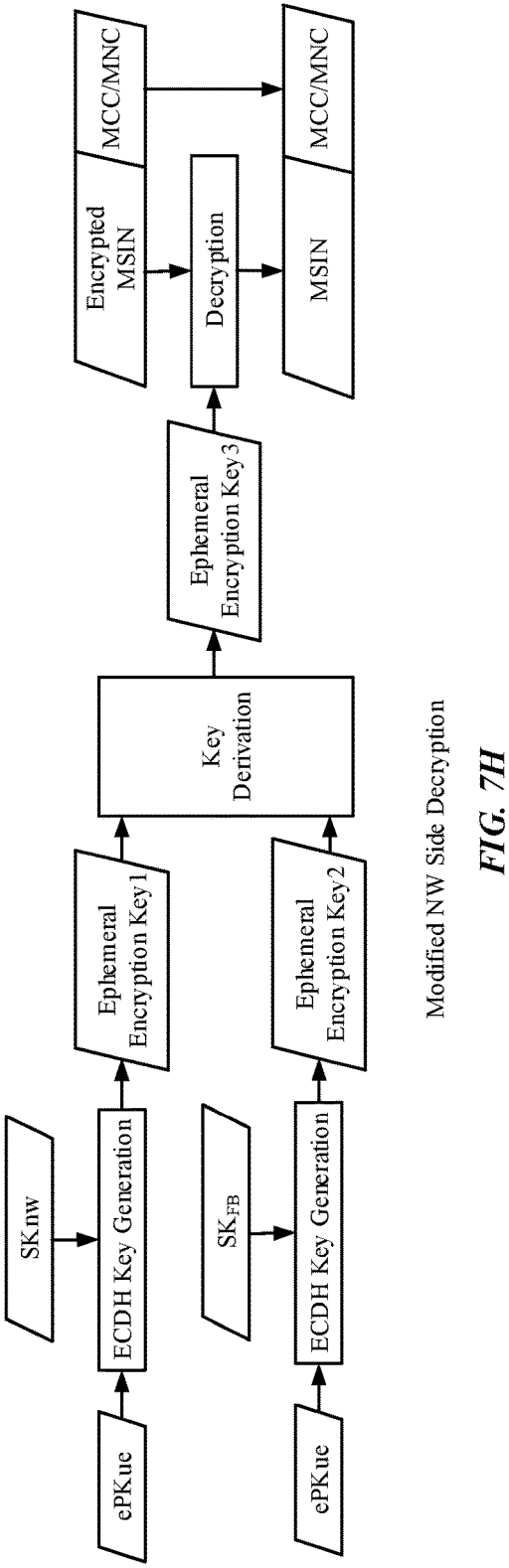

FIGS. 7G and 7H illustrate flow diagrams of further exemplary modified encryption techniques that encrypt (and decrypt) a SUPI to generate a fallback $SUCI_{FB}$. As with the modified encryption techniques illustrated in FIGS. 7C, 7D, 7E, and 7F, the techniques illustrated in FIGS. 7G and 7H can use an asymmetric fallback key pair $\{PK_{FB}, SK_{FB}\}$. FIG. 7G illustrates a flow diagram 730 of a UE side encryption using both a fallback public key $PK_{FB}$ and a network public key PKnw in combination with an ephemeral UE secret key eSKue to generate an ephemeral encryption key Key3 to encrypt an MSIN portion of a SUPI to generate the encrypted MSIN portion of a SUCI. At the UE side, the network public key PKnw, which can be provided by the network side to the UE side, and the ephemeral UE secret key SKue, which can be pre-generated or generated in real time by the UE side, are input to a first ECDH key generation block to generate a first ephemeral encryption key Key1. Additionally, at the UE side, the fallback public key $PK_{FB}$, which can be provided previously to the UE side by a trusted entity of the network side, and the ephemeral UE secret key SKue are input to a second ECDH key generation block to generate a second ephemeral encryption key Key2. In some embodiments, the first and second ECDH key generation blocks implement the same algorithm for key generation. In some embodiments, the first and second ECDH key generation blocks implement different algorithms for key generation. The first and second ephemeral encryption keys Key1 and Key2 are input to a key derivation block to generate the ephemeral encryption key Key3, which is used to encrypt the unencrypted MSIN portion of the SUPI to generate the encrypted MSIN portion of the SUCI.

FIG. 7H illustrates a flow diagram 735 of the corresponding network side decryption using both a fallback secret key $SK_{FB}$, which corresponds to the fallback public key $PK_{FB}$ used by the UE side, a network secret key SKnw, which corresponds to the network public key PKnw used by the UE side, and an ephemeral UE public key ePKue, which corresponds to the ephemeral UE secret key eSKue used by the UE side, to generate the set ephemeral encryption keys Key1 and Key2 and subsequently derive the ephemeral encryption key Key3 with which to decrypt the encrypted MSIN portion of a SUCI to obtain the unencrypted MSIN of a SUPI. The fallback secret key $SK_{FB}$ can be not known by a rogue wireless network entity, which can therefore not decrypt the SUCI to obtain the SUPI.

Single encryption using multiple combined encryption keys based on the flow diagrams 730 and 735 of FIGS. 7G and 7H provide similar benefits as the flow diagrams of FIGS. 7A, 7B, 7C, 7D, 7E, and 7F in that authentication failure can indicate that a new network public key provided by the network side (e.g., the cellular wireless network entity 516) cannot be trusted and should be not be used, while authentication success can indicate that the new network public key can be trusted, valid, and stored for continued and/or future use.

Figure 7I:
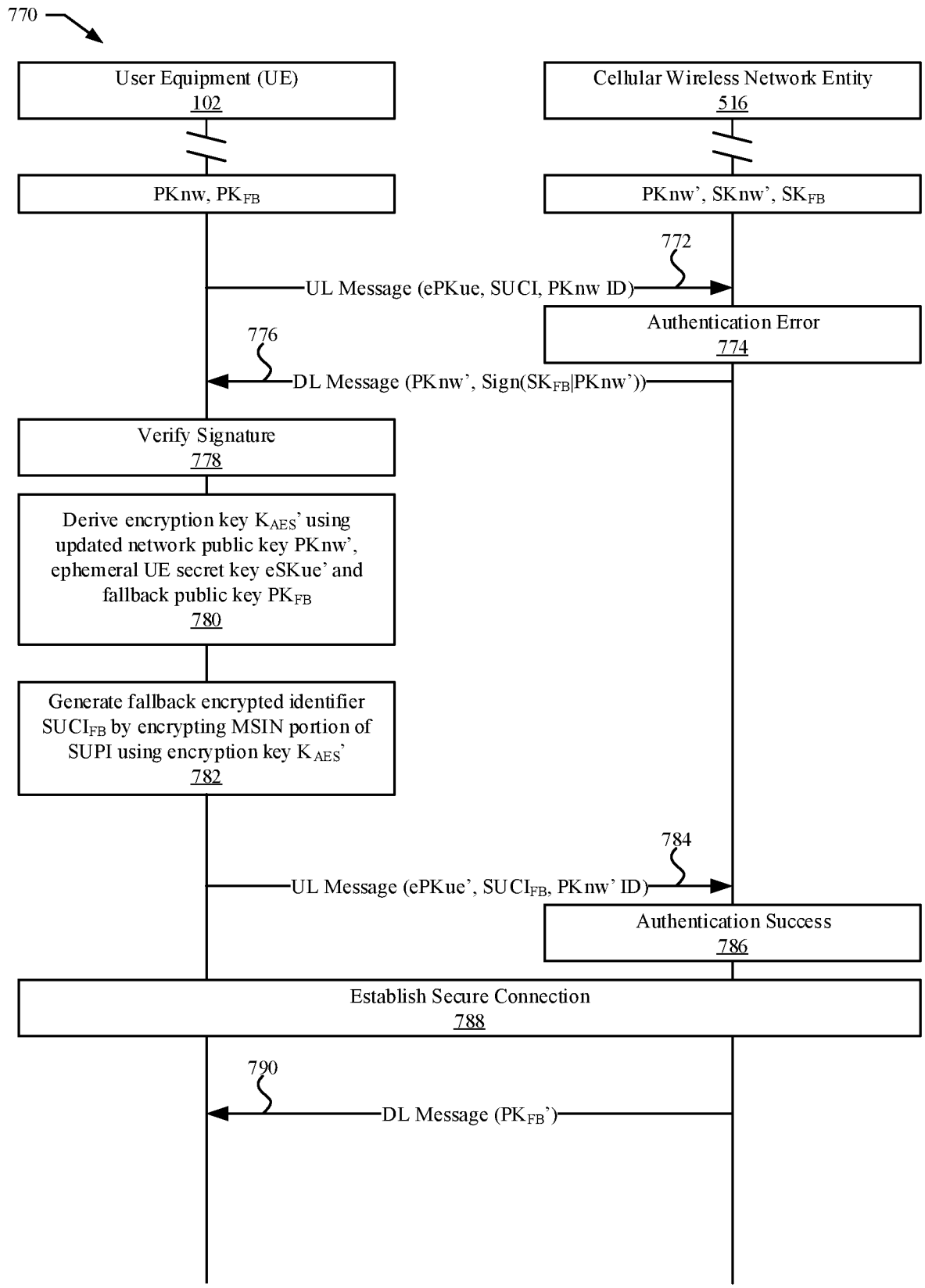
FIG. 7I illustrates another exemplary message exchange to protect the privacy of a subscriber identity including use of a fallback encryption key to protect communication during an authentication error condition, according to some embodiments.

FIG. 7I illustrates another message exchange sequence 770 to protect the privacy of a subscriber identity including use of a fallback asymmetric encryption key pair {$PK_{FB}$, $SK_{FB}$}. The UE 102 can be configured with a network public key PKnw and a fallback public key $PK_{FB}$, while the cellular wireless network entity 516 can be configured with an updated network public key PKnw', an updated network secret key PKnw', and a fallback secret key $SK_{FB}$, which corresponds to the fallback public key $PK_{FB}$ available at the UE 102. As previously discussed, asymmetric network key pairs can be updated over time, and in some instances, the UE 102 may miss an update for the asymmetric network key pairs resulting in the UE 102 using an outdated (and therefore invalid) network public key for encryption of the SUPI to generate the SUCI to communicate to the cellular wireless network entity 516 for authentication during an attach procedure (or for communication of another message used for authentication of the UE 102 with the cellular wireless network entity 516). The UE 102 can have previously generated a set of one or more encrypted SUCI identifiers based on the network public key PKnw and an ephemeral UE secret key eSKue. At 772, the UE 102 sends a first UL message to the cellular wireless network entity 516, such as during an attach procedure, to provide authentication, and/or to provide a location area update. The first UL message includes a SUCI, an ephemeral UE public key ePKue associated with the ephemeral UE secret key eSKue used to generate the SUCI, and an identifier PKnw ID for the network public key PKnw. At 774, the cellular wireless network entity 516 determines that an authentication error has occurred, e.g., based on an expired network public key PKnw used by the UE 102. At 776, the cellular wireless network entity 516 sends a DL message to the UE 102, the DL message including an updated network public key PKnw' and a signature with which to verify the updated network public key PKnw', where the signature is based on the fallback secret key $SK_{FB}$. At 778, the UE 102 verifies the signature in the DL message to determine whether to trust the DL message from the cellular wireless network entity 516 and to use the updated network public key PKnw' provided by the cellular wireless network entity 516. A rogue base station will not have access to the fallback asymmetric encryption key pair {$PK_{FB}$, $SK_{FB}$} and therefore should not be able to imitate a genuine base station. When the signature is verified, the UE 102, at 780, derives an updated encryption key $K_{AES}$' using the updated network public key PKnw' provided in the DL message, a new ephemeral secret key eSKue' (as the previous ephemeral secret key eSKue was already used to generate the encrypted SUCI that was rejected due to the authentication error), and the fallback public key $PK_{FB}$. Examples of using three keys to generate an ephemeral encryption key are shown in FIGS. 7E and 7I. At 782, the UE 102 generates a fallback encrypted identifier $SUCI_{FB}$, e.g., by encrypting an MSIN portion of the SUPI using the updated encryption key $K_{AES}$'. At 784, the UE 102 sends to the cellular wireless network entity 516 a second UL message that includes the updated network public key identifier PKnw' ID, the fallback $SUCI_{FB}$, and the updated ephemeral UE public key ePKue'. At 786, the cellular wireless network entity 516 successfully authenticates the UE 102 based on decryption of the fallback $SUCI_{FB}$. A rogue wireless network entity, e.g., a fake base station, would not have access to a corresponding fallback secret key $SK_{FB}$ and thus would not be able to decrypt the fallback $SUCI_{FB}$. Using the additional encryption based on the fallback asymmetric key pair {$PK_{FB}$, $SK_{FB}$} ensures the unencrypted subscriber identity SUPI is not revealed to the rogue wireless network entity, thereby preserving privacy of the subscriber identity. At 788, the UE 102 and the cellular wireless network entity 516 establish a secure connection, and using the secure connection, at 790, in some embodiments, the cellular wireless network entity 516 sends to the UE 102 a second DL message, which includes an updated fallback public key $PK_{FB}$'. The UE 102 can store the updated fallback public key $PK_{FB}$' for use later during authentication when an authentication error occurs.

Figure 8:
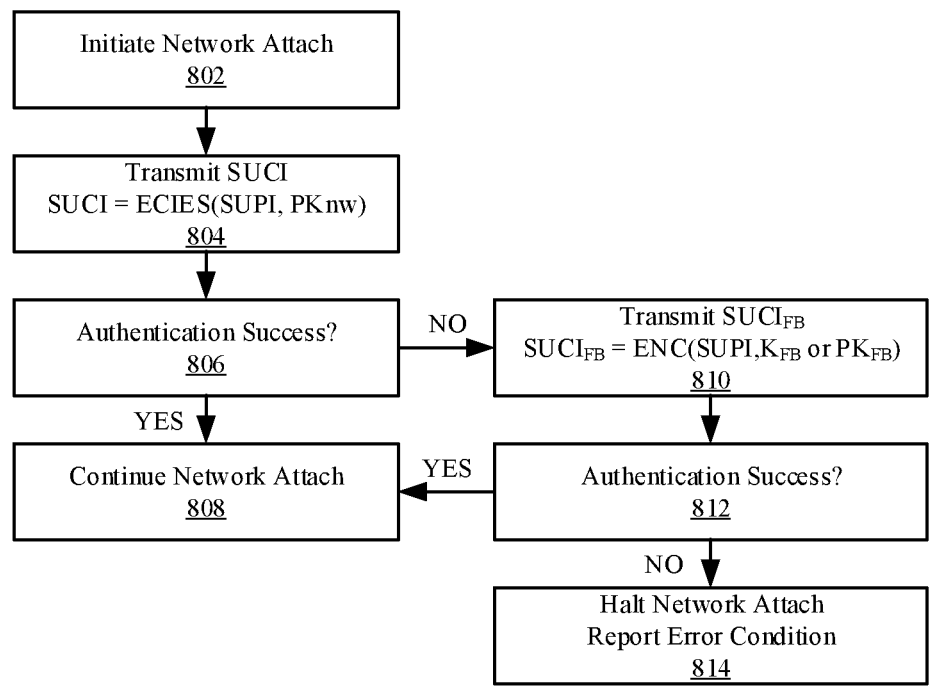
FIG. 8 illustrates a flow diagram of an exemplary sequence of actions to protect the privacy of a subscriber identity during a network attach procedure, according to some embodiments.

FIG. 8 illustrates a flow diagram 800 of an exemplary sequence of actions performed by a wireless device, e.g., UE 102, to protect the privacy of a subscriber identity during a network attach procedure. At 802, the UE 102 initiates a network attach procedure with a cellular wireless network entity 516, which may be not trusted by the UE 102 until authentication is successful. At 804, the UE 102 transmits an encrypted identifier, e.g., SUCI, to the cellular wireless network entity 516. In some embodiments, the SUCI is generated based on an Elliptic Curve Integrated Encryption Scheme (ECIES) using an unencrypted identifier, e.g., SUPI, a network public key PKnw, and an ephemeral UE secret key eSKue. At 806, the UE 102 determines whether authentication with the cellular wireless network entity 516 succeeds or fails, e.g., based on a message received from the cellular wireless network entity 516. When authentication succeeds, the UE 102, at 808, can continue the network attach procedure to establish a secure connection with the cellular wireless network entity 516. When authentication fails, the UE 102, at 810, can retry authentication by transmitting to the cellular wireless network entity 516 a second message that includes a fallback $SUCI_{FB}$ that is generated based on a combination of (i) the unencrypted identifier, e.g., SUPI, (ii) either a fallback encryption key $K_{FB}$ or a fallback public key $PK_{FB}$, and (iii) a different ephemeral UE secret key eSKue'. At 812, the UE 102 determines again whether authentication with the cellular wireless network entity 516 succeeds or fails, e.g., based on a message received from the cellular wireless network entity 516. When authentication succeeds, the UE 102, at 808, can continue the network attach procedure to establish a secure connection with the cellular wireless network entity 516. When authentication fails, at 814, the UE 102 can halt the network attach procedure and report a service denial error, e.g., by providing an indication on a display of the UE 102.

In some embodiments, the UE 102 pre-generates the fallback $SUCI_{FB}$ before initiating the attach procedure, e.g., as shown at 608 in FIG. 6A. In some embodiments, the UE 102 generates the fallback $SUCI_{FB}$ after initiating the attach procedure, e.g., as shown at 654 in FIG. 6B and at 782 in FIG. 7E. In some embodiments, the UE 102 generates the fallback $SUCI_{FB}$ based on a symmetric fallback key $K_{FB}$, e.g., as shown at 608 in FIG. 6A and in FIG. 7A. In some embodiments, the UE 102 generates the fallback $SUCI_{FB}$ based on a fallback public key $PK_{FB}$, e.g., as shown at 654 in FIG. 6B, in FIGS. 7C, 7E, 7G at 780/782 in FIG. 7I. The corresponding fallback secret key $SK_{FB}$ of the fallback encryption key pair $\{PK_{FB}, SK_{FB}\}$ is known only by trusted cellular wireless network entities, e.g., genuine base stations, and not known to rogue wireless network entities, e.g., fake base stations. Encrypting the SUPI to form a fallback encrypted $SUCI_{FB}$ and using the fallback $SUCI_{FB}$ under authentication error conditions can guard against attacks from rogue wireless entities that seek to decrypt a SUCI received from the UE 102 to obtain an unencrypted SUPI.

Figure 9:
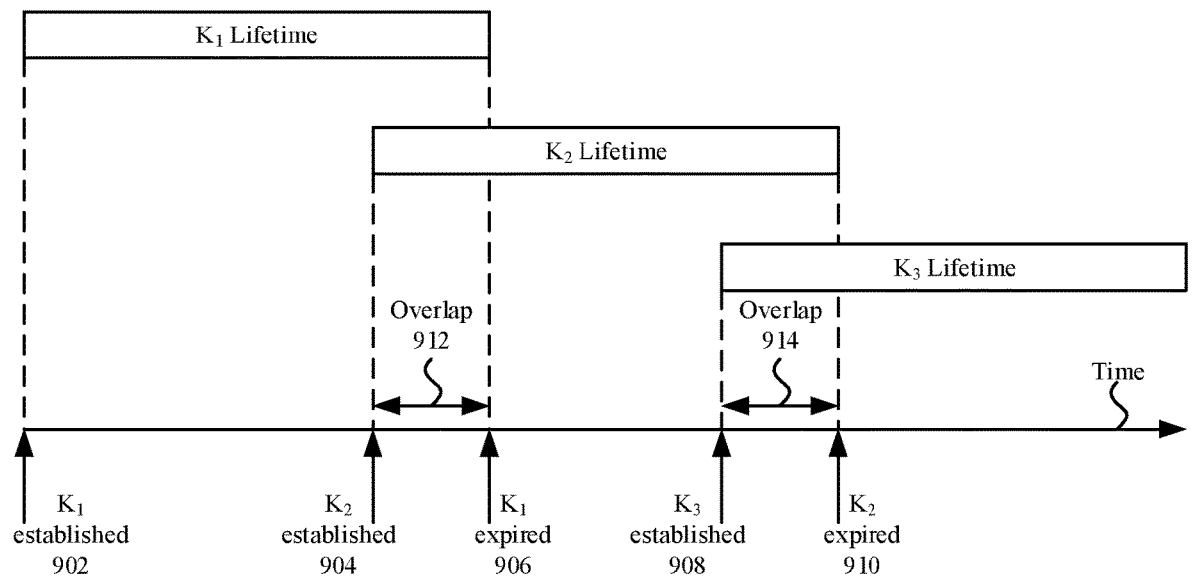
FIG. 9 illustrates a block diagram of an example of overlapping time periods for the use of network keys, according to some embodiments.

FIG. 9 illustrates a block diagram 900 of an example of overlapping time periods for the use of keys, including, for example a network public key PKnw, a symmetric fallback encryption key $K_{FB}$, and/or an asymmetric fallback encryption key pair $\{PK_{FB}, SK_{FB}\}$. In some embodiments, the time periods for a lifetime of the network public key PKnw is substantially shorter than a time period for a lifetime of the symmetric fallback encryption key $K_{FB}$ and/or the asymmetric fallback encryption key pair $\{PK_{FB}, SK_{FB}\}$. At a time indicated by 902, a first network public key K1 is established for use over a time period indicated as the K1 lifetime. When changing between different network public keys, such as when updating the network public key K1 to K2, a lifetime of a previous network public key can overlap with a lifetime of a newest network public key. For example, at a time indicated by 904, the second network public key K2 is established for use over a time period indicated as the K2 lifetime. As indicated in FIG. 9, the K1 and K2 lifetimes span an overlapping time period 912, where both the first key K1 and the second key K2 can be validly used before the first key K1 expires at time 906. The overlap allows for a variable time that the UE 102 can use to switch from using the first key K1 to using the second key K2. Similarly, when a third key K3 is established at time 908, the lifetime of the third key K3 overlaps for the time period 914 until expiration of the second key K2 at time 910. In some embodiments, network key pairs can be updated by the cellular wireless network entity 516, using an over-the-air (OTA) secure connection between the cellular wireless network entity 516 and the UE 102. Similarly, in some embodiments, network key pairs can overlap in time to allow for unplanned interruptions of transfer of an updated network public key from the cellular wireless network entity 516 to the UE 102 and for delays in updating the network public key at the UE 102. Robust key rotation can be achieved by keeping both old and new keys live (e.g., valid for use by the UE 102) during overlapping lifetimes. As discussed herein, some UL messages from the UE 102 can include a key ID to indicate which network public key was used by the UE 102 when deriving the encryption key with which the mobile subscriber identifier, such as the MSIN of an IMSI of the UE 102, was encrypted to form the SUCI from the SUPI. In some embodiments, symmetric fallback encryption keys $K_{FB}$ and/or a fallback public key $PK_{FB}$ can be provided to the UE 102 by the cellular wireless network entity 516, when trusted, such as via a secure connection established between the UE 102 and the cellular wireless network entity 516 after authentication is successful. In some embodiments, the symmetric fallback encryption key $K_{FB}$ and/or the asymmetric fallback public key $PK_{FB}$ can only be updated by a trusted server of a wireless network service provider, e.g., an MNO, or by a third-party entity entrusted with updates by the MNO. In some embodiments, overlap periods between successive symmetric fallback encryption keys $K_{FB}$ is minimal or no overlap exists between a previous symmetric fallback encryption key $K_{FB}$ and an updated symmetric fallback encryption key $K_{FB}'$. In some embodiments, overlap periods between successive asymmetric fallback encryption key pairs $\{PK_{FB}, SK_{FB}\}$ is minimal or no overlap exists between a previous asymmetric encryption key pair $\{PK_{FB}, SK_{FB}\}$ and an updated asymmetric encryption key pair $\{PK_{FB}', SK_{FB}'\}$.

Figure 10A:
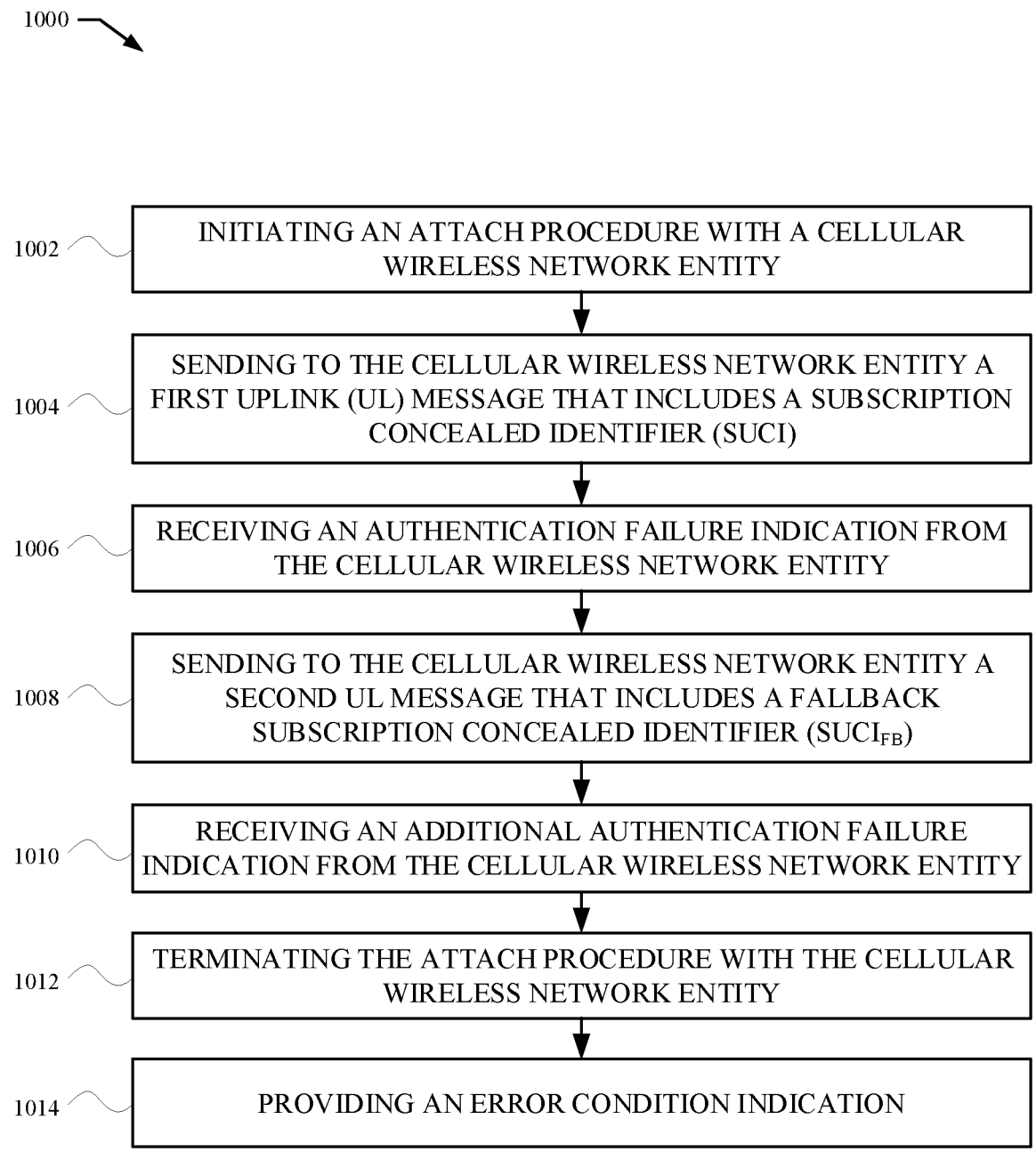
FIGS. 10A, 10B, and 10C illustrate exemplary flow diagrams of actions performed by a UE to implement a method to protect the privacy of a subscriber identity, according to some embodiments.

FIG. 10A illustrates a flow diagram 1000 of an exemplary set of actions performed by a wireless device, e.g., UE 102, to protect the privacy of a subscriber identity. At 1002, the UE 102 initiates an attach procedure with a cellular wireless network entity 516. At 1004, the UE 102 sends to the cellular wireless network entity 516 a first uplink (UL) message that includes a subscription concealed identifier (SUCI). At 1006, the UE 102 receives an authentication failure indication from the cellular wireless network entity 516. In some embodiments, the authentication failure indication includes a request to reattempt authentication using a fallback $SUCI_{FB}$. In some embodiments, the authentication failure indication includes an updated network public key PKnw'. In some embodiments, the authentication failure indication includes a signature based on a symmetric fallback key $K_{FB}$ or an asymmetric fallback secret key $SK_{FB}$, the signature usable by the UE 102 to verify the validity of the updated network public key PKnw'. At 1008, the UE 102 sends to the cellular wireless network entity 516 a second UL message that includes a fallback $SUCI_{FB}$. In some embodiments, the UE 102 pre-generates the fallback $SUCI_{FB}$ before initiating the attach procedure. In some embodiments, the UE 102 generates the fallback $SUCI_{FB}$ during the attach procedure. In some embodiments, the UE 102 generates the fallback $SUCI_{FB}$ based on a the symmetric fallback key $K_{FB}$ or an asymmetric fallback public key $PK_{FB}$. In some embodiments, the UE 102 generates the fallback $SUCI_{FB}$ using the updated network public key PKnw' when verified by the UE 102, e.g., based on an accompanying signature. At 1010, the UE receives an additional authentication failure indication from the cellular wireless network entity 516. As authentication has failed twice using a regular SUCI and a fallback $SUCI_{FB}$, the UE 102 can conclude that the cellular wireless network entity 516 may not be trusted and at 1012 terminate the attach procedure with the cellular wireless network entity 516. At 1014, the UE 102 can provide an error condition indication, e.g., a service denial error.

Figure 10B:
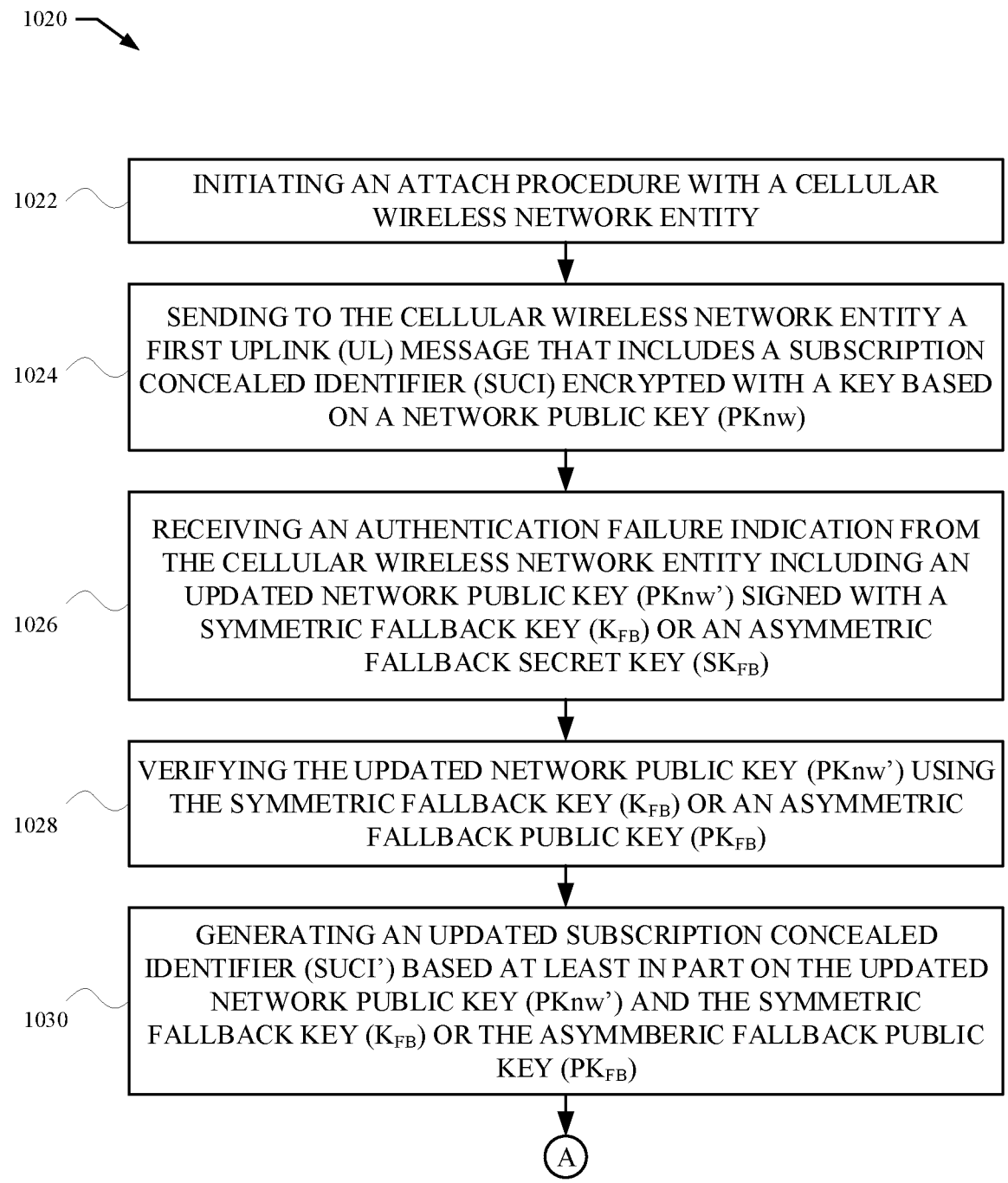
Figure 10C:
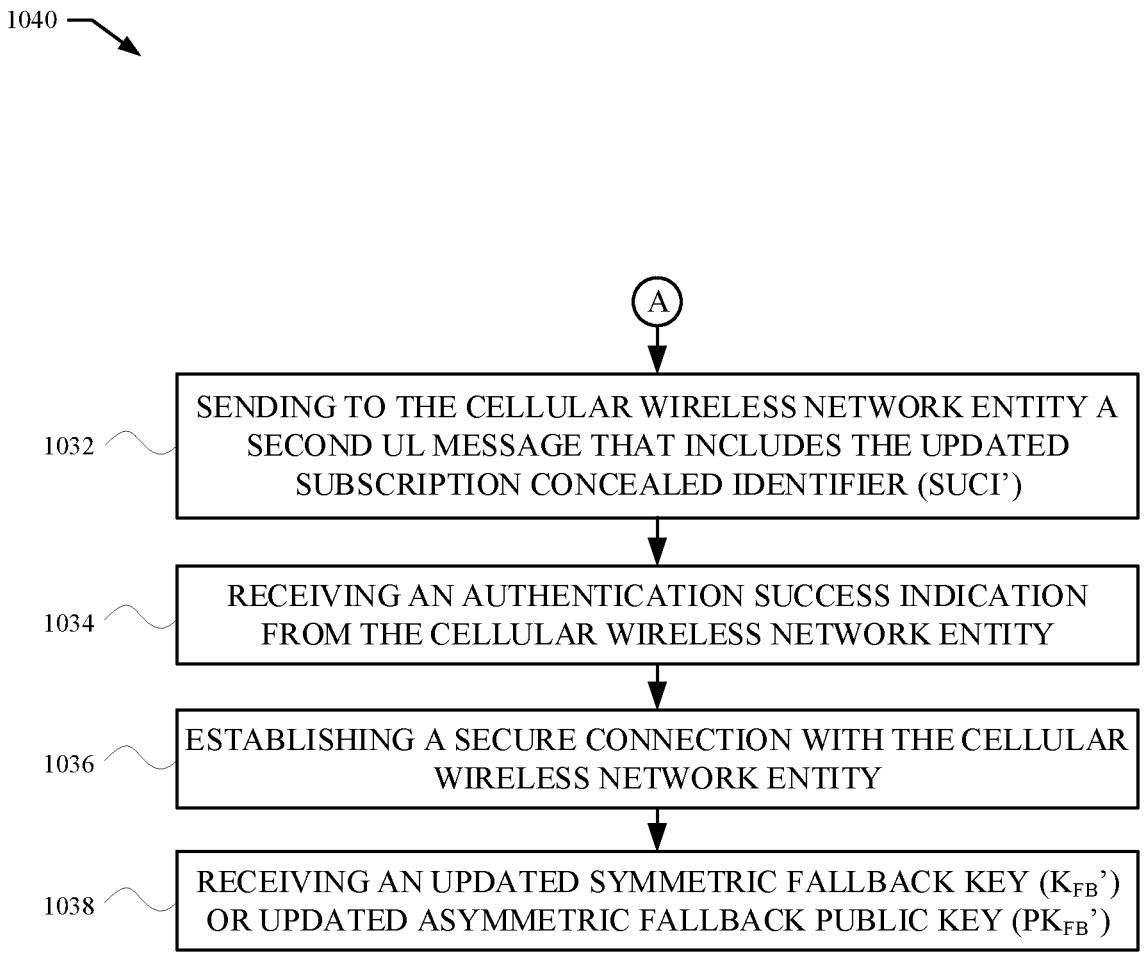

FIGS. 10B and 10C illustrates flow diagrams 1020 and 1040 of another exemplary set of actions performed by a wireless device, e.g., UE 102, to protect the privacy of a subscriber identity. At 1022, the UE 102 initiates an attach procedure with a cellular wireless network entity 516. At 1024, the UE sends to the cellular wireless network entity 516 a first uplink (UL) message that includes a subscription concealed identifier (SUCI) encrypted with an encryption key based on a network public key PKnw. At 1026, the UE 102 receives from the cellular wireless network entity 516 an authentication failure indication that includes an updated network public key PKnw' signed with a symmetric fallback key $K_{FB}$ or with an asymmetric fallback secret key $SK_{FB}$. At 1028, the UE 102 verifies the updated network public key PKnw' using the symmetric fallback key $K_{FB}$ or an asymmetric fallback public key $PK_{FB}$ that corresponds to the asymmetric fallback secret key $SK_{FB}$. When verification is successful, at 1030, the UE 102 generates an updated SUCI' based at least in part on the updated PKnw' and the symmetric fallback key $K_{FB}$ or the asymmetric fallback public key $PK_{FB}$. At 1032, the UE 102 sends to the cellular wireless network entity 516 a second UL message that includes the updated SUCI'. At 1034, the UE 102 receives from the cellular wireless network entity 516 an authentication success indication. At 1036, the UE 102 establishes a secure connection with the cellular wireless network entity. At 1038, in some embodiments, the UE 102 receives via the secure connection an updated symmetric fallback key $K_{FB}'$ or an updated asymmetric fallback public key $PK_{FB}'$.

Figure 11:
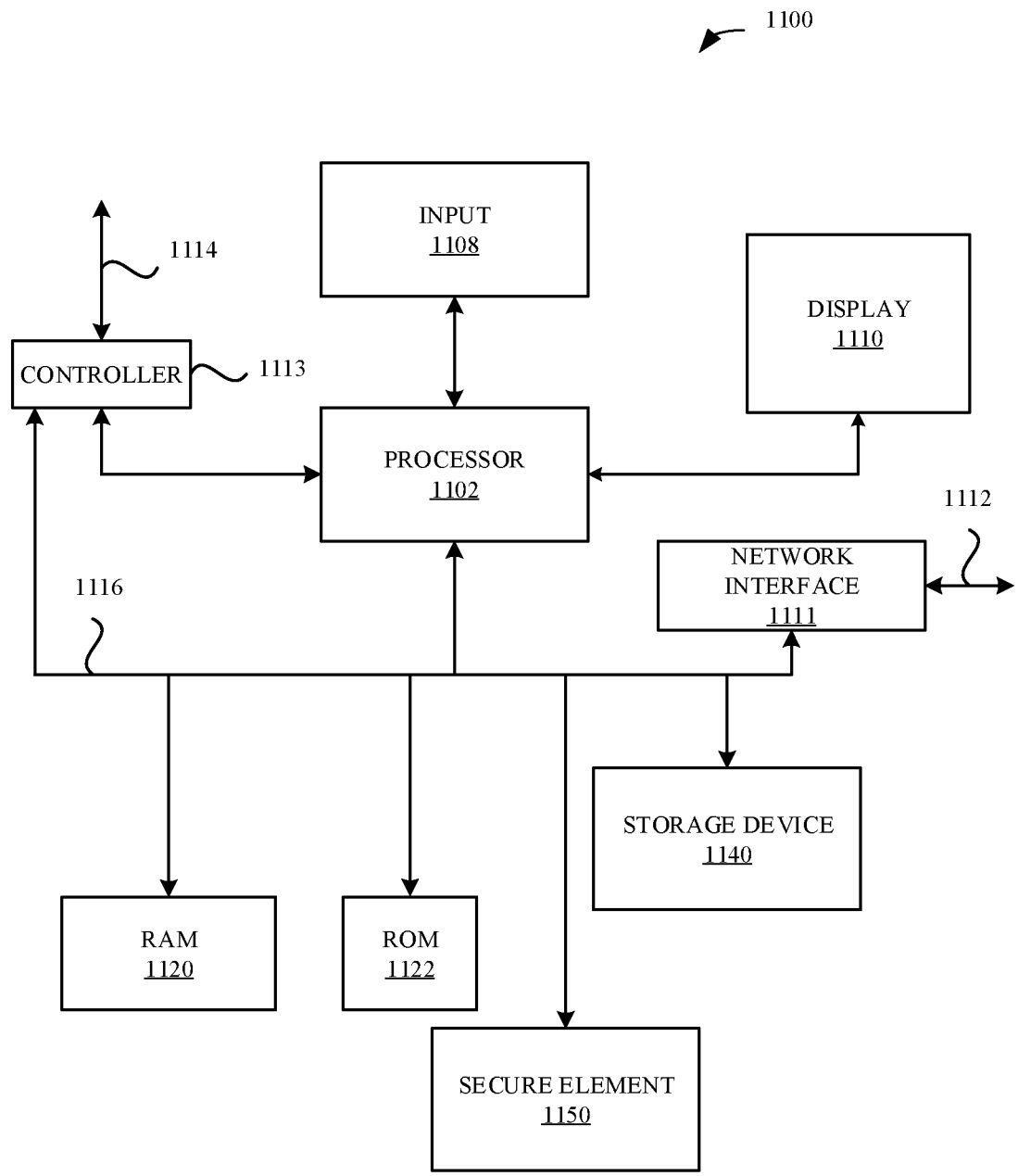
FIG. 11 illustrates a detailed view of a representative computing device that can be used to implement various methods described herein, according to some embodiments.

FIG. 11 illustrates a detailed view of a representative computing device 1100 that can be used to implement various methods described herein, according to some embodiments. In particular, the detailed view illustrates various components that can be included in the UE 102 illustrated in FIG. 1. As shown in FIG. 11, the computing device 1100 can include a processor 1102 that represents a microprocessor or controller for controlling the overall operation of computing device 1100. The computing device 1100 can also include a user input device 1108 that allows a user of the computing device 1100 to interact with the computing device 1100. For example, the user input device 1108 can take a variety of forms, such as a button, keypad, dial, touch screen, audio input interface, visual/image capture input interface, input in the form of sensor data, etc. Still further, the computing device 1100 can include a display 1110 (screen display) that can be controlled by the processor 1102 to display information to the user. A data bus 1116 can facilitate data transfer between at least a storage device 1140, the processor 1102, and a controller 1113. The controller 1113 can be used to interface with and control different equipment through and equipment control bus 1114. The computing device 1100 can also include a network/bus interface 1111 that couples to a data link 1112. In the case of a wireless connection, the network/bus interface 1111 can include a wireless transceiver.

The computing device 1100 also includes a storage device 1140, which can comprise a single disk or a plurality of disks (e.g., hard drives), and includes a storage management module that manages one or more partitions within the storage device 1140. In some embodiments, storage device 1140 can include flash memory, semiconductor (solid state) memory or the like. The computing device 1100 can also include a Random Access Memory (RAM) 1120 and a Read-Only Memory (ROM) 1122. The ROM 1122 can store programs, utilities or processes to be executed in a non-volatile manner. The RAM 1120 can provide volatile data storage, and stores instructions related to the operation of the computing device 1100. The computing device 1100 can further include a secure element (SE) 1150, which can represent an eUICC 108, of the UE 102.

The various aspects, embodiments, implementations or features of the described embodiments can be used separately or in any combination. Software, hardware, or a combination of hardware and software can implement various aspects of the described embodiments. The described embodiments can also be embodied as computer readable code on a non-transitory computer readable medium. The non-transitory computer readable medium is any data storage device that can store data, which can thereafter be read by a computer system. Examples of the non-transitory computer readable medium include read-only memory, random-access memory, CD-ROMs, DVDs, magnetic tape, hard disk drives, solid state drives, and optical data storage devices.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A user equipment (UE) comprising:
   wireless circuitry configurable for wireless communication with a cellular wireless network; and
   processing circuitry communicatively coupled to the wireless circuitry and comprising a processor and a memory storing instructions, the UE configured to:
   send, to a cellular wireless network entity as part of an attach procedure, an uplink (UL) message that includes a fallback subscription concealed identifier ($SUCI_{FB}$), when the UE has received an authentication failure indication associated with an initial subscription concealed identifier (SUCI) related to a subscription permanent identifier (SUPI);
   receive an authentication success indication from the cellular wireless network entity in response to the UL message; and
   establish a secure connection with the cellular wireless network entity,
   wherein the fallback $SUCI_{FB}$ is generated by encryption of the SUPI based at least in part on a symmetric fallback encryption key ($K_{FB}$) or an asymmetric fallback public key ($PK_{FB}$) provisioned to the UE by the cellular wireless network entity or by another network entity of the cellular wireless network.

2. The UE of claim 1, wherein the fallback $SUCI_{FB}$ is generated by the UE prior to initiation of the attach procedure with the cellular wireless network entity.

3. The UE of claim 1, wherein the fallback $SUCI_{FB}$ is generated by the UE based on information included in the authentication failure indication.

4. The UE of claim 1, wherein the authentication failure indication comprises a message requesting the UE retry authentication using the fallback $SUCI_{FB}$.

5. The UE of claim 1, wherein:
   the initial SUCI is encrypted with an encryption key derived from a network public key (PKnw) provided by the cellular wireless network and an ephemeral UE secret key (eSKue) generated by the UE;
   the authentication failure indication comprises an updated network public key (PKnw') signed with the symmetric fallback encryption key $K_{FB}$ or the asymmetric fallback public key $PK_{FB}$; and
   the fallback $SUCI_{FB}$ is further encrypted with the updated network public key PKnw'.

6. The UE of claim 5, wherein the UE is further configured to:

verify the updated network public key PKnw' using the symmetric fallback key $K_{FB}$ or the asymmetric fallback public key $PK_{FB}$ before generating the fallback $SUCI_{FB}$.

7. The UE of claim 1, wherein the UE, after establishing the secure connection with the cellular wireless network entity, is further configured to:
receive from a network-based server a downlink (DL) message that includes an updated network public key (PKnw');
derive a new encryption key $K_{AES}'$ based on the updated network public key PKnw' and a newly generated ephemeral UE secret key (eSKue');
generate a new SUCI' based on the SUPI and the new encryption key $K_{AES}'$; and
store the new SUCI' in a storage medium of the UE.

8. The UE of claim 7, wherein the DL message comprises a carrier bundle update for a plurality of mobile network operators (MNOs) including the updated network public key PKnw' for a wireless network of at least one of the plurality of MNOs.

9. The UE of claim 8, wherein the network-based server comprises a third-party server maintained by an entity other than the plurality of MNOs.

10. The UE of claim 7, wherein the DL message comprises an over-the-air (OTA) update from a provisioning server of an MNO, the DL message provided to an embedded Universal Integrated Circuit Card (eUICC) or to a physical Subscriber Identity Module (SIM) card of the UE.

11. The UE of claim 1, wherein the cellular wireless network entity comprises an evolved NodeB (eNodeB) or a next generation NodeB (gNB).

12. The UE of claim 1, wherein:
the SUPI comprises an International Mobile Subscriber Identity (IMSI); and
the initial SUCI comprises an encrypted version of a mobile subscriber identification number (MSIN) of the IMSI.

13. A cellular wireless network entity of a cellular wireless network, the cellular wireless network entity comprising:
wireless circuitry configurable for wireless communication with a user equipment (UE); and
processing circuitry communicatively coupled to the wireless circuitry and comprising a processor and a memory storing instructions, the cellular wireless network entity configured to:
transmit, to the UE as part of an attach procedure, an authentication failure indication associated with an initial subscription concealed identifier (SUCI) related to a subscription permanent identifier (SUPI);
receive, from the UE, an uplink (UL) message that includes a fallback subscription concealed identifier ($SUCI_{FB}$); and
establish a secure connection with the UE,
wherein the UE generates the fallback $SUCI_{FB}$ by encryption of the SUPI based at least in part on a symmetric fallback encryption key ($K_{FB}$) or an asymmetric fallback public key ($PK_{FB}$) provisioned to the UE by the cellular wireless network entity or by another network entity of the cellular wireless network.

14. The cellular wireless network entity of claim 13, the UE generates the fallback $SUCI_{FB}$ based on information included in the authentication failure indication.

15. The cellular wireless network entity of claim 13, wherein the authentication failure indication comprises a message requesting the UE retry authentication using the fallback $SUCI_{FB}$.

16. The cellular wireless network entity of claim 13, wherein:
the initial SUCI is encrypted by the UE with an encryption key derived from a network public key (PKnw) previously provided by the cellular wireless network to the UE and an ephemeral UE secret key (eSKue) generated by the UE;
the authentication failure indication comprises an updated network public key (PKnw') signed with the symmetric fallback encryption key $K_{FB}$ or the asymmetric fallback public key $PK_{FB}$; and
the fallback $SUCI_{FB}$ is further encrypted with the updated network public key PKnw'.

17. The cellular wireless network entity of claim 13, wherein the cellular wireless network entity comprises an evolved NodeB (eNodeB) or a next generation NodeB (gNB).

18. The cellular wireless network entity of claim 13, wherein:
the SUPI comprises an International Mobile Subscriber Identity (IMSI); and
the initial SUCI comprises an encrypted version of a mobile subscriber identification number (MSIN) of the IMSI.

19. A non-transitory computer-readable storage medium storing instructions that, when executed by one or more processors of a user equipment (UE), configure to the UE to:
send, to a cellular wireless network entity of a cellular wireless network as part of an attach procedure, an uplink (UL) message that includes a fallback subscription concealed identifier ($SUCI_{FB}$), when the UE has received an authentication failure indication associated with an initial subscription concealed identifier (SUCI) related to a subscription permanent identifier (SUPI);
receive an authentication success indication from the cellular wireless network entity in response to the UL message; and
establish a secure connection with the cellular wireless network entity,
wherein the fallback $SUCI_{FB}$ is generated by encryption of the SUPI based at least in part on a symmetric fallback encryption key ($K_{FB}$) or an asymmetric fallback public key ($PK_{FB}$) provisioned to the UE by the cellular wireless network entity or by another network entity of the cellular wireless network.

20. The non-transitory computer-readable storage medium of claim 19, wherein the authentication failure indication comprises a message requesting the UE retry authentication using the fallback $SUCI_{FB}$.

* * * * *